United States Patent
Youn et al.

(10) Patent No.: US 12,424,882 B2
(45) Date of Patent: Sep. 23, 2025

(54) COMMUNICATION RESET AND ABORTION IN WIRELESS POWER TRANSMISSION SYSTEM

(71) Applicant: LG Electronics Inc., Seoul (KR)

(72) Inventors: Jinho Youn, Seoul (KR); Gyunghwan Yook, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/685,080

(22) PCT Filed: Aug. 24, 2022

(86) PCT No.: PCT/KR2022/012682
§ 371 (c)(1),
(2) Date: Feb. 20, 2024

(87) PCT Pub. No.: WO2023/027514
PCT Pub. Date: Mar. 2, 2023

(65) Prior Publication Data
US 2025/0219469 A1 Jul. 3, 2025

(30) Foreign Application Priority Data

Aug. 24, 2021 (KR) .................. 10-2021-0111803
Aug. 27, 2021 (KR) .................. 10-2021-0114209

(51) Int. Cl.
*H02J 50/80* (2016.01)
*H02J 50/40* (2016.01)

(52) U.S. Cl.
CPC .............. *H02J 50/80* (2016.02); *H02J 50/40* (2016.02)

(58) Field of Classification Search
CPC .................................. H02J 50/80; H02J 50/40
(Continued)

(56) References Cited

U.S. PATENT DOCUMENTS

| 2015/0006395 A1* | 1/2015 | Chu .................. G06Q 20/40 |
| | | 705/44 |
| 2020/0044694 A1* | 2/2020 | Park .................. H02J 50/80 |

(Continued)

FOREIGN PATENT DOCUMENTS

| JP | 2021002995 A | 1/2021 |
| JP | 2003-110563 | 8/2023 |

(Continued)

OTHER PUBLICATIONS

[No Author Listed], "Qi Specification," Communications Protocol, Version 1.3, published by the Wireless Power Consortium, Jan. 2021, 137 Pages.

(Continued)

*Primary Examiner* — Alfonso Perez Borroto
(74) *Attorney, Agent, or Firm* — Fish & Richardson P.C.

(57) ABSTRACT

The present disclosure provides a method for transmitting wireless power performed by a wireless power transmitter in a wireless power transmission system, and a device using same, the method characterized by entering a power transmission phase associated with transmission of wireless power, and transmitting a first data stream to a wireless power receiver during the power transmission phase, wherein the wireless power transmitter: transmits, to the wireless power receiver, reset information notifying of the resetting of the first data stream; receives a response to the reset information from the wireless power receiver; and resets the first data stream on the basis of receiving the response.

15 Claims, 36 Drawing Sheets

(58) Field of Classification Search
USPC .......................................................... 307/104
See application file for complete search history.

(56) References Cited

U.S. PATENT DOCUMENTS

2020/0252886 A1* 8/2020 Park ...................... H04W 52/34
2020/0373792 A1 11/2020 Park
2020/0403455 A1 12/2020 AbuKhalaf et al.
2022/0173918 A1* 6/2022 Alessi .................... H02J 50/80

FOREIGN PATENT DOCUMENTS

| KR | 10-2010-0059545 | 6/2010 |
| KR | 10-2019-0122214 | 10/2019 |
| KR | 10-2021-0000265 | 1/2021 |
| WO | WO 2015/164154 | 10/2015 |

OTHER PUBLICATIONS

Office Action in Japanese Appln. No. 2024-510686, mailed on Mar. 11, 2025, 7 pages (with English translation).
International Search Report and Written Opinion in International Appln. No. PCT/KR2022/012682, mailed on Nov. 30, 2022, 17 pages (with English translation).
Extended European Search Report in European Appln. No. 22861722.1, mailed on Feb. 5, 2025, 8 pages.
Wireless Power Consortium, "Qi Specification—Power Delivery (Version 1.3)," XP093212389, Chapter 7: Power transfer phase, Section 7.2: Data Transport Stream, Subsection 7.2.4.8: Data Transport Stream Control, Version 1.3, Jan. 2021, 256 pages.

* cited by examiner

|  | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Reserved | | | | | | | |
| $B_2$ | ZERO | Ai | Reserved | OB | ZERO | Count | | |
| $B_3$ | Window Size | | | | Window Offset | | | |
| $B_4$ | Neg | Pol | Depth | | Buffer Size | | | Dup |

Extended Power Transfer Contract

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

FIG. 18

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | 1 | | | | TBD | | | |
| $B_1$ | PRMC | | | | | | | |
| $B_2$ | | | | | | | | |
| $B_3$ | 1 | | | | Random Identifier | | | |
| $B_4$ | | | | | | | | |
| $B_5$ | | | | | | | | |
| $B_6$ | Mfg Rsvd | | | | | | | |

MPP ID Packet Structure

FIG. 19

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | XID Selector (0xFE) |||||||| 
| $B_1$ | Restricted || R | Chime | Reserved | Family Collection |||
| $B_2$ | Preferred Frequency ||| Freq Mask |||||
| $B_3$ | VRECT ||||||||
| $B_4$ | Alpha0 Rx ||||||||
| $B_5$ | Alpha1 Rx ||||||||
| $B_6$ | Alpha-Kth Rx ||||||||
| $B_7$ | Mfg Rsvd ||||||||

MPP XID Packet Parameters

FIG. 20
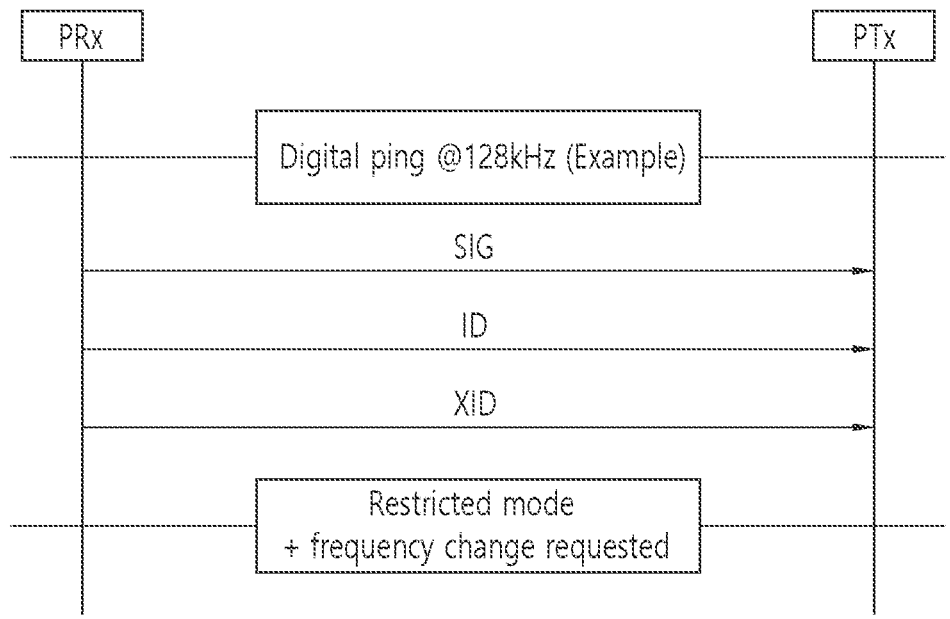
Transmitter removes power signal and restarts ping phase with the new frequency
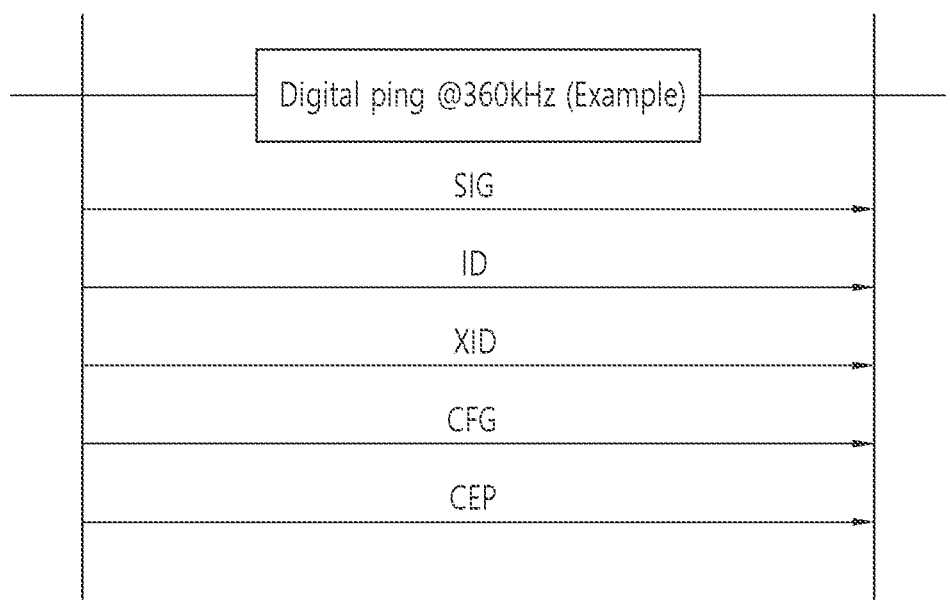

FIG. 23

|     | b7 | b6 | b5 | b4 | b3 | b2 | b1 | b0 |
|-----|----|----|----|----|----|----|----|----|
| B0  | Request       |    |    |    | (msb) |    |    |
| B1  | Parameter     |    |    |    |    |    | (lsb) |

FIG. 24

|     | b7 | b6 | b5 | b4 | b3 | b2 | b1 | b0 |
|-----|----|----|----|----|----|----|----|----|
| B0  | Data |
| ⋮   | |
| Bn  | |

Data transmission from application perspective

FIG. 30

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | Request | | | | | (msb) | | |
| $B_1$ | Parameter | | | | | | | (lsb) |
| $B_2$ | Application stream number | | | | | | | |

*Reqeust : 5 – ADC/rst

*Parameter: Indicates application stream information to be reset

*In addition to B2, the stream for which reset is desired is indicated separately

FIG. 36

(Example of separate pause packet)

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | \multicolumn{8}{c}{TPL/type} |

| | $b_7$ | $b_6$ | $b_5$ | $b_4$ | $b_3$ | $b_2$ | $b_1$ | $b_0$ |
|---|---|---|---|---|---|---|---|---|
| $B_0$ | | | | | | | | |

0x00-TPL/Pause
0x01-TPL/Busy
0x02-TPL/Abort
0x03 ~ 0xFF-TPL/Reserved

FIG. 37

(Example of granting additional functions to existing packet/
Granting additional functions to DSR in case of PRx)

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | Type | | | | | | | |
| $B_1$ | TPL/type | | | | | | | |

0x00-TPL/Pause
0x01-TPL/Busy
0x02-TPL/Abort
0x03 ~ 0xFF-TPL/Reserved

COMMUNICATION RESET AND ABORTION IN WIRELESS POWER TRANSMISSION SYSTEM

CROSS-REFERENCE TO RELATED APPLICATIONS

This application is a National Stage application under 35 U.S.C. § 371 of International Application No. PCT/KR2022/012682, filed on Aug. 24, 2022, which claims the benefit of Korean Patent Application No. 10-2021-0111803, filed on Aug. 24, 2021, and Korean Patent Application No. 10-2021-0114209, filed on Aug. 27, 2021. The disclosures of the prior applications are incorporated by reference in their entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, it is intended to provide a method for resetting and aborting data communication in a wireless power transmission system and a device using the same.

SUMMARY

According to an embodiment of the present specification, a method and apparatus may be provided wherein the wireless power transmitter transmits reset information indicating reset of the first data stream to the wireless power receiver, the wireless power transmitter receives a response to reset information from the wireless power receiver, and the wireless power transmitter performs a reset of the first data stream based on receiving the response.

According to the present specification, the efficiency of the data transport stream can be improved and stable data communication can be possible. In addition, according to the present specification, even if the memory for data communication and storage is stuck and recovery is no longer possible, because a configuration is provided to perform a reset while keeping the application stream open, this can result in the wireless power transmitter and the wireless power receiver being able to directly perform data communication. In addition, according to the present specification, even when data communication and storage are stuck and recovery is no longer possible, the effect of starting new data communication based on forced termination can occur.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 18 schematically shows the structure of an MPP ID packet.

FIG. 19 schematically shows an example of an XID packet in MPP.

FIG. 20 schematically shows the protocol in MPP restricted mode.

FIG. 23 schematically shows an example of an ADC packet.

FIG. 24 schematically shows an example of an ADT packet.

FIG. 30 schematically shows an example of reset information.

FIG. 36 schematically shows an example of abort information.

FIG. 37 schematically shows another example of abort information.

MODE

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
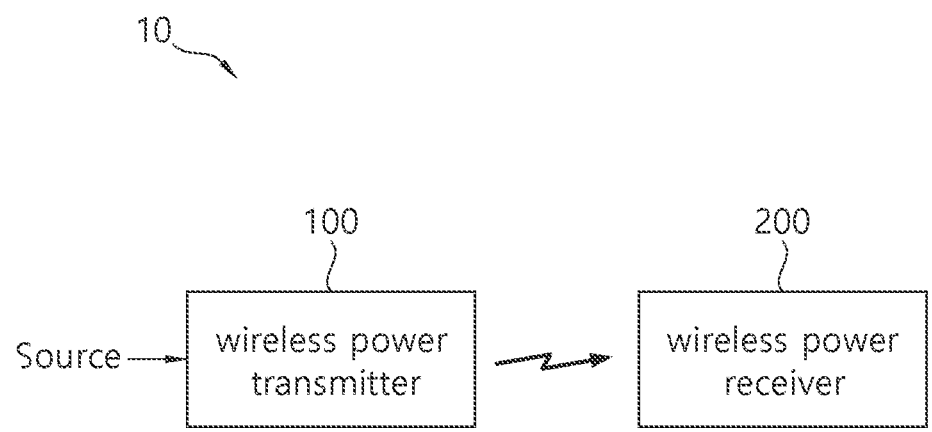
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source(S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
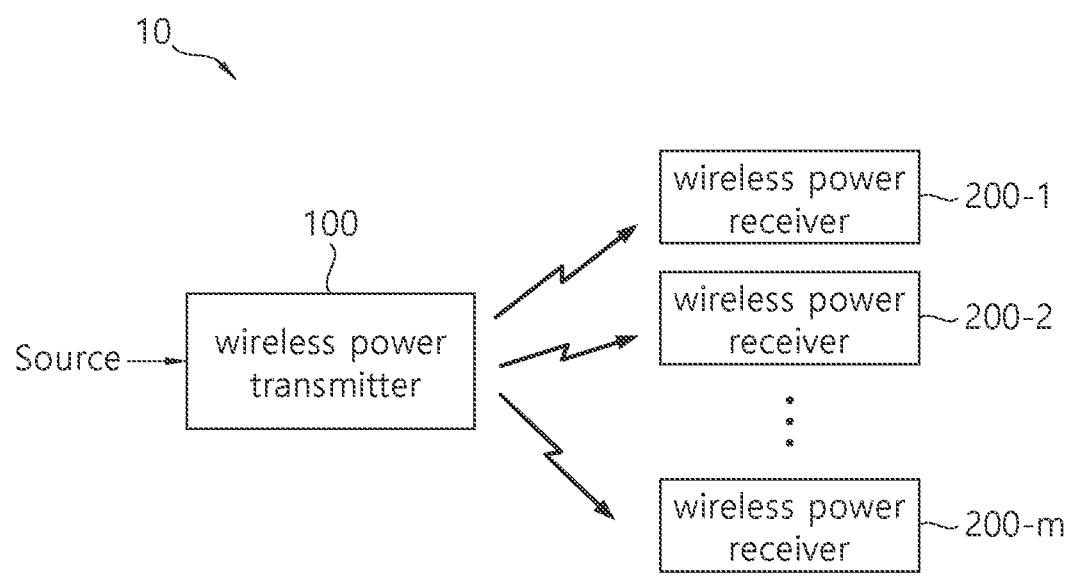
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
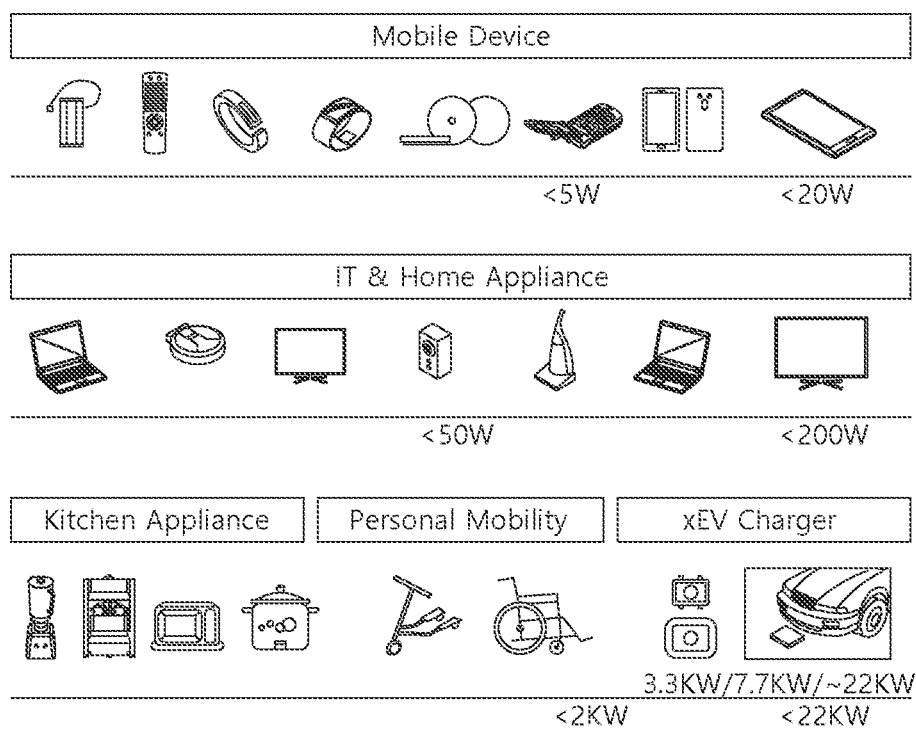
FIG. 3 shows an exemplary embodiment of diverse electronic devices adopting a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5W or less or approximately 20W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50W or less or approximately 200W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5W, and the EPP is related to a wireless power transmitter and a wireless power receiver supporting the transfer of a power range greater than 5W and less than 30W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5W. The application of PC-1 includes wearable devices, such as smart watches.

The PC0 standard relates to wireless power transmitters and receivers providing a guaranteed power of 5W. The PC0 standard includes an EPP having a guaranteed power ranges that extends to 30W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30W to 150W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200W transfers power to a wireless power receiver having a maximum guaranteed power of 5W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user can experience a smart wireless charging service in a hotel. When a user enters a hotel room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Welcome to ###hotel. Select "Yes" to activate smart charging functions: Yes | No Thanks." The smartphone receives the user's input of selecting Yes or No Thanks and performs the next procedure selected by the user. If Yes is selected, the smartphone transmits the information to the wireless charger. And the smartphone and wireless charger perform the smart charging function together.

Smart wireless charging service may also include receiving auto-filled WiFi credentials. For example, a wireless charger transmits WiFi credentials to a smartphone, and the smartphone runs the appropriate app and automatically enters the WiFi credentials received from the wireless charger.

Smart wireless charging service may also include running a hotel application that provides hotel promotions, remote check-in/check-out, and obtaining contact information.

As another example, users can experience smart wireless charging services within a vehicle. When the user gets into the vehicle and places the smartphone on the wireless charger, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user to confirm his or her identity.

In this state, the smartphone automatically connects to the car via WiFi and/or Bluetooth. The smartphone can display the message on the screen with or without an alarm sound. An example of a message may include phrases such as "Welcome to your car. Select "Yes" to synch device with in-car controls: Yes | No Thanks." The smartphone receives the user's input of selecting Yes or No Thanks and performs the next procedure selected by the user. If Yes is selected, the smartphone transmits the information to the wireless charger. And by running the in-vehicle application/display software, the smartphone and wireless charger can perform in-vehicle smart control functions together. Users can enjoy the music they want and check regular map locations. In-vehicle application/display software may include the capability to provide synchronized access for pedestrians.

As another example, users can experience smart wireless charging at home. When a user enters a room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Hi xxx, Would you like to activate night mode and secure the building?: Yes | No Thanks." The smartphone receives the user's input of selecting Yes or No Thanks and performs the next procedure selected by the user. If Yes is selected, the smartphone transmits the information to the wireless charger. Smartphones and wireless chargers can at least recognize user patterns and encourage users to lock doors and windows, turn off lights, or set alarms.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

Figure 4:
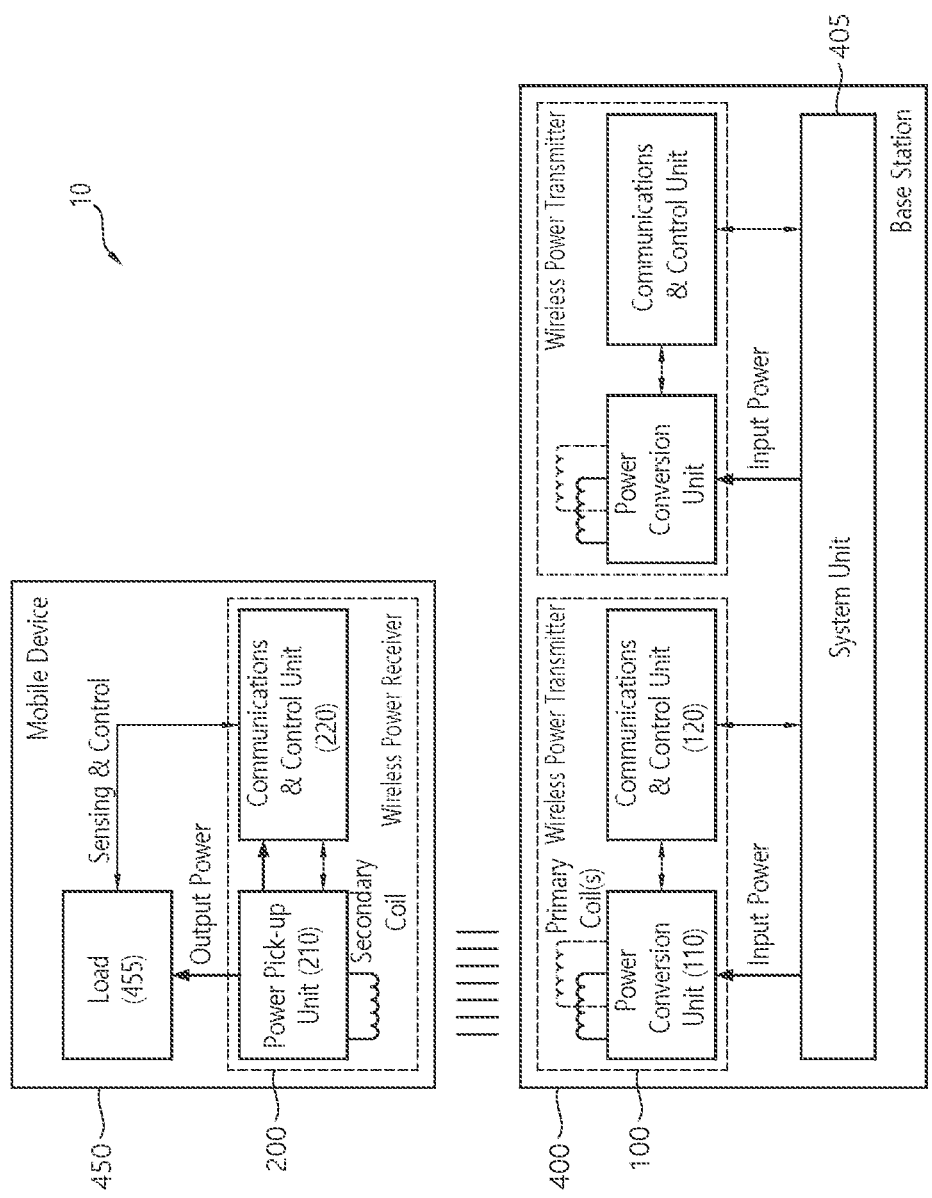
FIG. 4 is a block diagram of a wireless power transmission system according to one embodiment.

FIG. 4 is a block diagram of a wireless power transmission system according to one embodiment.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

Meanwhile, in the WPC system, the wireless power transmitter 100 may be classified, for example, in terms of power transmission amount. At this time, the wireless power transmitter 100 supporting a wireless power transmission amount of up to 5W (i.e., the wireless power transmitter 100 supporting the BPP protocol) can be classified into, for example, type A wireless power transmitter 100 and type B wireless power transmitter 100, the wireless power transmitter 100 supporting a wireless power transmission amount of up to 15W (i.e., the wireless power transmitter 100 supporting the EPP protocol) can be classified into, for example, type MP-A (MP-A) wireless power transmitter 100 and type MP-B (type MP-B) wireless power transmitter 100.

Type A and Type MP A wireless power transmitters (100)
Type A and Type MP A wireless power transmitters 100 may have one or more primary coils. Type A and Type MP A wireless power transmitters 100 activate a single primary coil at a time, so a single primary cell matching the activated primary coil can be used.

Type B and Type MP B wireless power transmitter (100)
Type B and Type MP B power transmitters may have a primary coil array. And Type B and Type MP B power transmitters can enable free positioning. To this end, Type B and Type MP B power transmitters can activate one or more primary coils in the array to realize primary cells at different locations on the interface surface.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Meanwhile, although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 5:
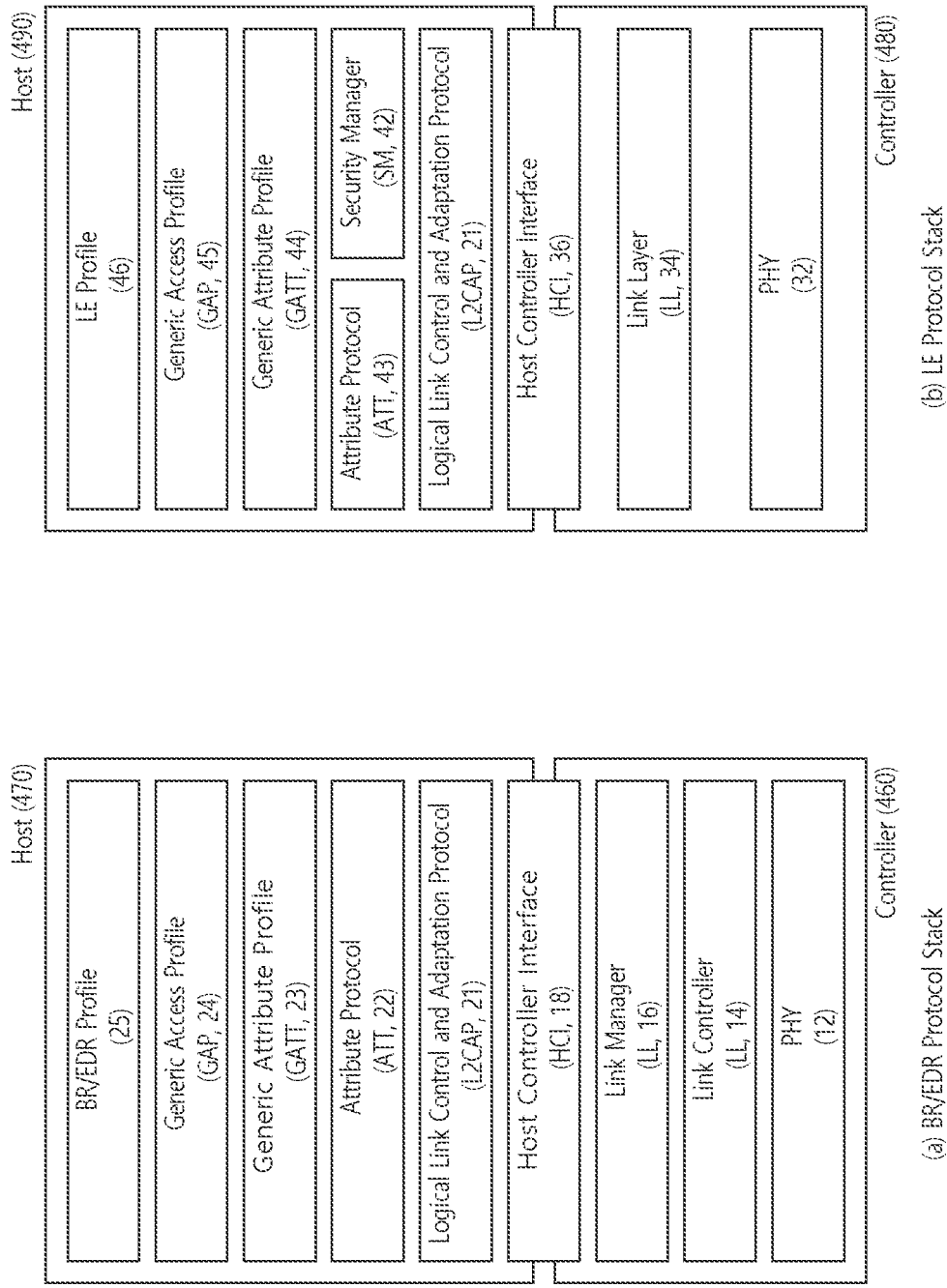
FIG. 5 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 5.

FIG. 5 is a diagram illustrating an example of a Bluetooth communication architecture to which an embodiment according to the present disclosure may be applied.

Referring to FIG. 5, (a) of FIG. 5 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 5, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 5, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value. When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 6:
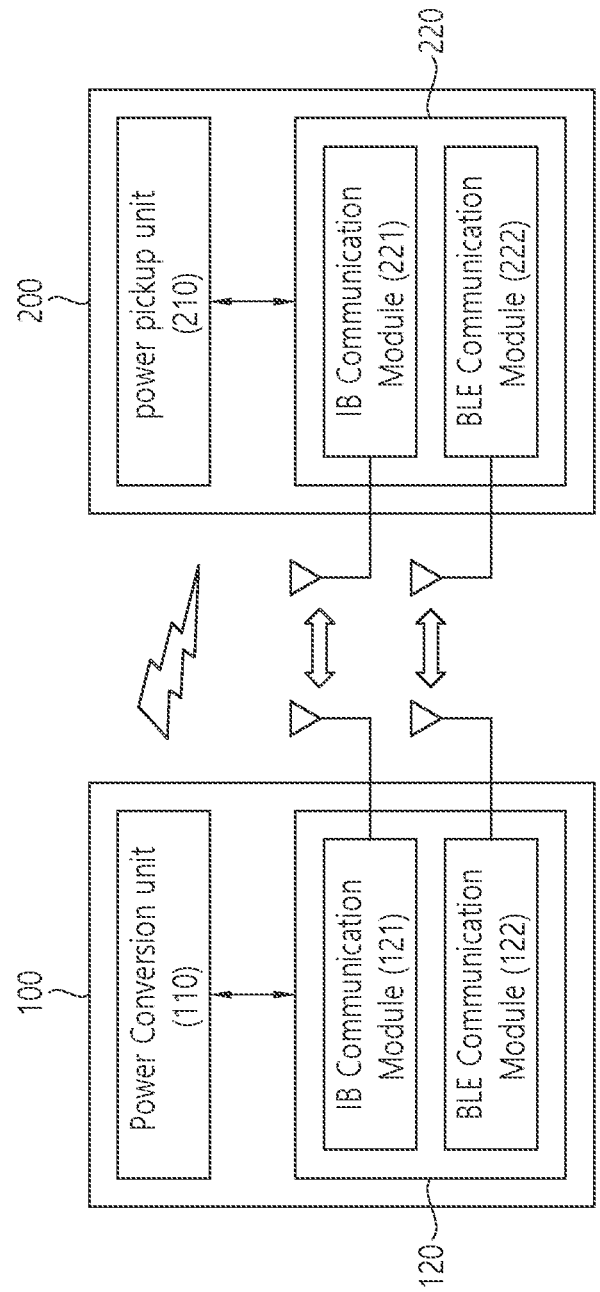
FIG. 6 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 6.

FIG. 6 is a block diagram illustrating a wireless power transfer system using BLE communication according to an example.

Referring to FIG. 6, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 5. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 7:
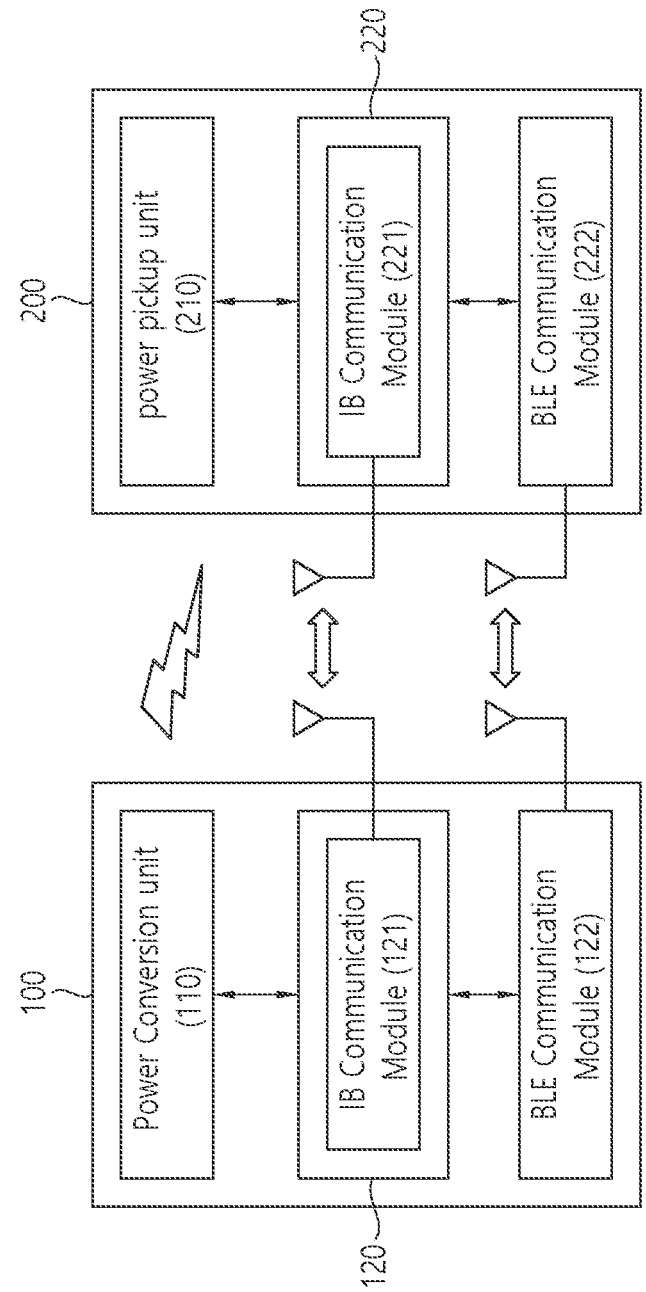
FIG. 7 is a block diagram illustrating a wireless power transfer system using BLE communication according to another example.

FIG. 7 is a block diagram illustrating a wireless power transfer system using BLE communication according to another example.

Referring to FIG. 7, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Meanwhile, when the user places the wireless power receiver 200 within the operating volume of the wireless power transmitter 100, the wireless power transmitter 100 and the wireless power receiver 200 begin communication for the purpose of configuring and controlling power transmission. At this time, the power signal can provide a carrier for all communications, and the protocol for communication can be composed of several steps. Hereinafter, the communication protocol will be described.

Figure 8:
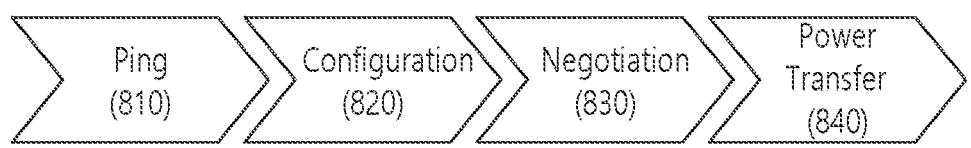
FIG. 8 is a state transition diagram for explaining the wireless power transfer procedure.

FIG. 8 is a state transition diagram for explaining the wireless power transfer procedure.

WPC can define two communication protocols.

Baseline Protocol (or BPP): May refer to an original protocol that supports only one-way communication from the wireless power receiver 200 to the wireless power transmitter 100.

Extended Protocol (or EPP): Supports two-way communication and improved foreign object detection (FOD) functions, and can also support data transport stream functions and authentication options.

Referring to FIG. 8, the power transfer operation between the wireless power transmitter 100 and the wireless power receiver 200 according to an embodiment of the present specification can be largely divided into a ping phase (810), a configuration phase (820), a negotiation phase (830), and a power transfer phase.

Ping Phase (810)

In the ping phase 810, the wireless power transmitter 100 may attempt to establish communication with the wireless power receiver 200. Before attempting to establish communication, measurements may be performed to determine whether there are objects such as bank cards, coins or other metals that may be damaged or heated during power transfer. Here, these measurements can be performed without waking up the wireless power receiver 200.

Here, after obtaining design information from the wireless power receiver 200, the wireless power transmitter 100 may postpone a conclusion about whether the detected metal is a foreign object or a friendly metal to the negotiation phase 830.

Configuration Phase (820)

In the configuration phase 820, the wireless power receiver 200 may send basic identification and configuration data to the wireless power receiver 200. And, both the wireless power transmitter 100 and the wireless power receiver 200 can use this information to create a baseline power transfer contract.

Additionally, the wireless power transmitter 100 and the wireless power receiver 200 may determine whether to continue the baseline protocol or the extended protocol in the configuration phase 820.

Here, the wireless power receiver 200 can use functions such as enhanced FOD, data transport stream, and authentication only when implementing the extended protocol.

Negotiation Phase (830)

In the negotiation phase 830, the wireless power transmitter 100 and the wireless power receiver 200 may establish an extended power transfer contract that includes additional settings and restrictions. Additionally, the wireless power receiver 200 may provide design information to the wireless power transmitter 100. Later, the design information can be used to complete the FOD before transitioning to the power transfer phase 840.

Here, the negotiation phase 830 may correspond to a step that does not exist in the baseline protocol.

Power Transfer Phase (840)

The power transfer phase 840 may be a step in which power is transferred to the load of the wireless power receiver 200.

In the extended protocol, the wireless power transmitter 100 and the wireless power receiver 200 may perform system calibration when this step begins. This stage may occasionally be interrupted to renegotiate elements of the power transfer contract. However, power transfer may continue even during this renegotiation.

Below, as previously explained, each protocol for Ping Phase 810, Configuration Phase 820, Negotiation Phase 830, and Power Transfer Phase 840 will be explained in more detail.

1. Ping Phase (810)

When the ping phase 810 begins, the wireless power transmitter 100 does not yet know whether the wireless power receiver 200 is within the operating volume. In addition, the wireless power transmitter 100 cannot recognize the wireless power receiver 200. For that reason, this system is usually disabled due to lack of power signal.

In this situation, before the wireless power transmitter 100 starts a digital ping to request a response from the wireless power receiver 200, the wireless power transmitter 100 may go through the following steps.

Figure 9:
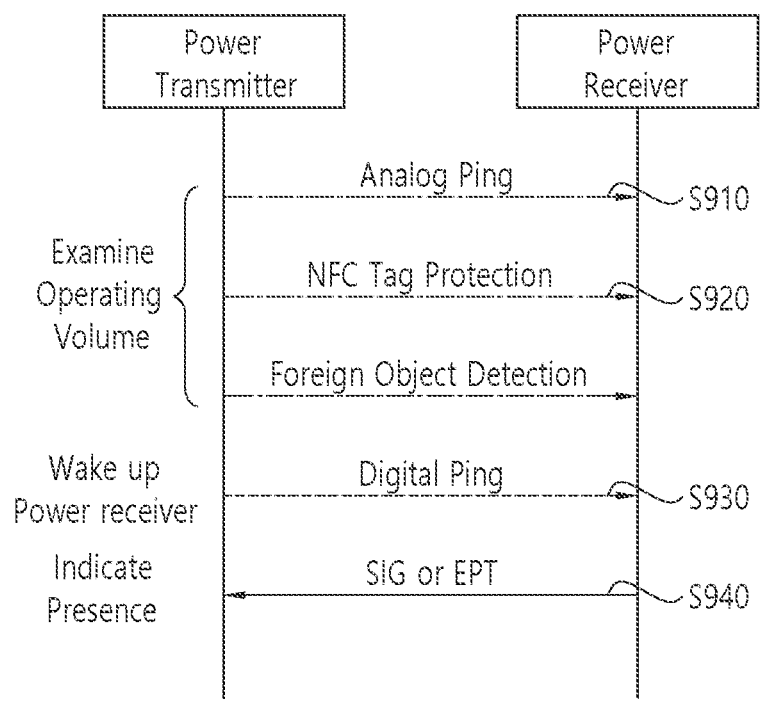
FIG. 9 schematically shows an example of the protocol of the ping phase 810.

FIG. 9 schematically shows an example of the protocol of the ping phase 810.

According to FIG. 9, the wireless power transmitter 100 can perform analog ping (S910). That is, the wireless power transmitter 100 can confirm whether an object exists in the operating volume by transmitting an analog ping. For example, a wireless power transmitter can detect whether an object exists in the operating space based on a change in current in the transmission coil or primary coil.

The wireless power transmitter 100 may apply NFC tag protection (S920). Here, NFC tag protection can be performed through the following procedures.
  a) First, it can be confirmed whether one or more of the detected objects include an NFC tag.
  b) Afterwards, it can be checked whether the object containing the NFC tag can withstand the power signal without damage.
  c) If the wireless power transmitter 100 determines that the NFC tag cannot withstand the power signal, it does not start digital ping and maintains the ping phase, the wireless power transmitter 100 can inform the user of the reason why it cannot proceed.

The wireless power transmitter 100 may perform foreign object detection (S930). That is, the wireless power transmitter 100 can collect information helpful in determining whether there is a foreign object other than the wireless power receiver 200. For this purpose, the wireless power transmitter 100 can use various methods such as a pre-power FOD method.

Meanwhile, in the three steps (S910, S920, and S930) described above, the radio power receiver may not operate.

If the wireless power transmitter 100 performs the above steps and determines that the wireless power receiver 200 is potentially present in the operating volume, the wireless power transmitter 100 may start a digital ping (S940). Here, the digital ping may request a response such as a signal strength (SIG) data packet or an end power transfer (EPT) data packet from the wireless power receiver 200.

Thereafter, the wireless power transmitter 100 may receive the SIG or EPT from the wireless power receiver 200 (S950). Here, the SIG data packet may provide a measure of coupling, and the SIG data packet may include information about signal strength values. Additionally, the EPT data packet may provide a request to stop power transmission and a reason for the request.

If the wireless power transmitter 100 does not receive the above response from the wireless power receiver 200, the wireless power transmitter 100 may repeat the above steps while remaining in the ping phase 810.

2. Configuration Phase (820)

The configuration phase 820 is part of the following protocol.
  The wireless power receiver 200 can identify itself to the wireless power transmitter 100.
  The wireless power receiver 200 and the wireless power transmitter 100 can establish a baseline power transfer contract.
  The wireless power receiver 200 and the wireless power transmitter 100 can determine the protocol variant to be used for power transmission.

In the configuration phase 820, the wireless power transmitter 100 and the wireless power receiver 200 may continue to operate using the digital ping parameter. This may mean that the power and current levels of both the wireless power transmitter 100 and the wireless power receiver 200 change only when the user moves the wireless power receiver 200 from position within the operating volume.

Hereinafter, the protocol in the configuration phase 820 will be described in more detail.

Figures 10, 11:
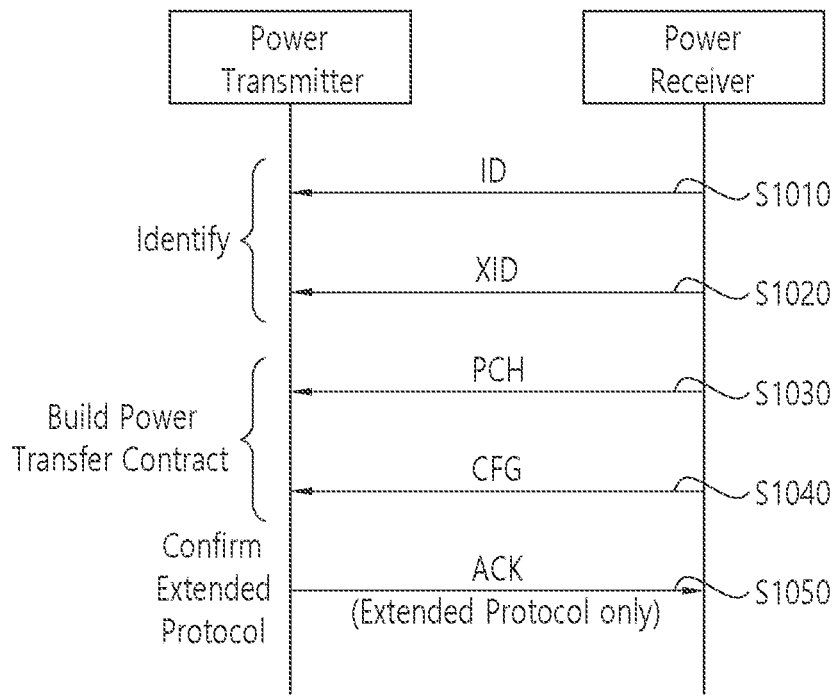
FIG. 10 schematically shows an example of the protocol of the configuration phase 820.
FIG. 11 is a diagram illustrating a message field of a configuration packet (CFG) of a wireless power reception device according to an embodiment.

FIG. 10 schematically shows an example of the protocol of the configuration phase 820.

According to FIG. 10, the wireless power transmitter 100 may receive an identification (ID) from the wireless power receiver 200 (S1010). Alternatively, the wireless power transmitter 100 may also receive an extended identification (XID) from the wireless power receiver 200 (S1020). That is, the wireless power receiver 200 may identify itself using an ID data packet and, optionally, an XID data packet.

The wireless power transmitter 100 may selectively receive a power control hold-off (PCH) data packet from the wireless power receiver 200 (S1030), the wireless power transmitter 100 may receive a CFG data packet from the wireless power receiver 200 (S1040). That is, the wireless power receiver 200 can provide data for use in a power transfer contract using PCH and/or CFG data packets.

Finally, the wireless power transmitter 100 can check the extended protocol if possible (S1050).

Each data packet described above can be summarized as follows.
  ID: The ID data packet may be information that identifies the wireless power receiver 200. Here, the ID may include a manufacturer code, basic device identifier, etc. In addition, the ID may also include information that identifies the presence or absence of an XID data packet in the setup phase.
  XID: XID data packets may contain additional identification data.
  PCH: The PCH data packet may configure the delay between the reception of the CE data packet and the wireless power transmitter 100 starting coil current adjustment.
  CFG: CFG data packets can provide basic configuration data.

For example, a CFG data packet can provide all parameters governing power transfer in the baseline protocol. In addition, CFG data packets can provide all FSK communication parameters used in the extended protocol. Additionally, CFG data packets may provide additional functions of the wireless power receiver 200.

FIG. 11 is a diagram illustrating a message field of a configuration packet (CFG) of a wireless power reception device according to an embodiment.

According to FIG. 11, the configuration packet (CFG) according to one embodiment may have a header value of 0×51, and the message field of the configuration packet (CFG) may include a 1-bit authentication (AI) flag and a 1-bit outband (OB) flag.

The authentication flag (AI) indicates whether the wireless power receiving device supports the authentication function. For example, if the value of the authentication flag (AI) is '1', it indicates that the wireless power receiving device supports the authentication function or can operate as an authentication initiator, if the value of the authentication flag (AI) is '0', it may indicate that the wireless power receiving device does not support the authentication function or cannot operate as an authentication initiator.

The out-of-band (OB) flag indicates whether the wireless power receiving device supports out-of-band communication. For example, if the value of the out-of-band (OB) flag is '1', the wireless power receiver indicates out-of-band communication, if the value of the outband (OB) flag is '0', it may indicate that the wireless power receiving device does not support outband communication.

Provision of the ID and/or XID described above is for identification purposes. Additionally, the provision of PCH and/or CFG is for the construction of a power transfer contract.

3. Negotiation Phase (830)

The negotiation phase 830 is part of an extended protocol that allows the wireless power transmitter 100 and the wireless power receiver 200 to change the power transfer contract. There are two types of this stage.

Negotiation phase (830): The negotiation phase (830) directly follows the configuration phase (820) and serves to create an initial extended power transfer contract. In addition, the negotiation phase 830 also serves to complete the pre-power FOD function. Here, the length of the negotiation phase is not limited.

Renegotiation phase: The renegotiation phase can interrupt the power transfer phase (840) multiple times and generally serves to adjust a single element of the power transfer contract. In addition, FOD/qf, FOD/rf, and SRQ/rpr data packets may not be used in the renegotiation phase. Constraints on CE data packets in the power transfer phase 840 limit the length of the renegotiation phase.

In the negotiation or renegotiation phase, the power transfer contract related to the reception/transmission of wireless power between a wireless power receiving device and a wireless power transmitting device is expanded or changed, or a renewal of the power transfer contract is made that adjusts at least some of the elements of the power transfer contract, or information may be exchanged to establish out-of-band communication.

Figure 12:
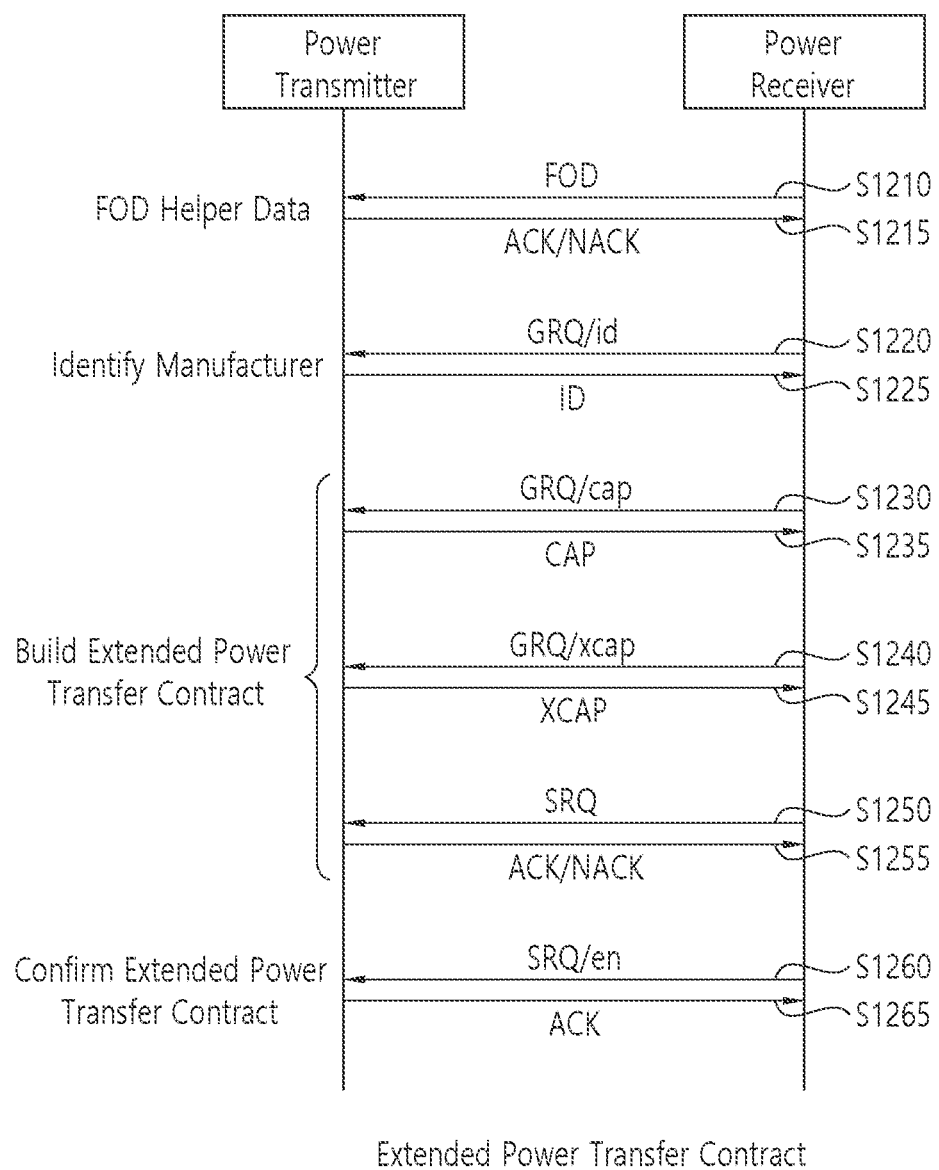
FIG. 12 is a flowchart schematically illustrating a protocol of a negotiation stage or a renegotiation stage according to an embodiment.

FIG. 12 is a flowchart schematically illustrating a protocol of a negotiation stage or a renegotiation stage according to an embodiment.

Referring to FIG. 12, the wireless power transmitter 100 may receive a FOD status data packet (e.g. FOD) from the wireless power receiver 200 (S1210). Here, the wireless power receiver 200 can use the FOD status data packet to inform the wireless power transmitter 100 of the effect its presence has on selected properties of the reference wireless power transmitter 100. And, the wireless power transmitter 100 can configure the FOD function using this information.

The wireless power transmitter 100 may transmit an ACK/NAK for the FOD status data packet to the wireless power receiver 200 (S1215).

Meanwhile, the wireless power receiver 200 may receive an identification data packet (ID), a capabilities data packet (CAP), and an extended CAP (XCAP) of the wireless power transmitter 100 using a general request data packet (GRQ).

The general request packet (GRQ) may have a header value of 0×07 and may include a 1-byte message field. The message field of the general request packet (GRQ) may include a header value of a data packet that the wireless power receiver 200 requests from the wireless power transmitter 100 using the GRQ packet.

For example, in the negotiation phase or renegotiation phase, the wireless power receiver 200 may transmit a GRQ packet (GRQ/id) requesting an ID packet of the wireless power transmitter 100 to the wireless power transmitter 100 (S1220).

The wireless power transmitter 100 that has received the GRQ/id may transmit an ID packet to the wireless power receiver 200 (S1225). The ID packet of the wireless power transmitter 100 includes information about the 'Manufacturer Code'. The ID packet containing information about the 'Manufacturer Code' allows the manufacturer of the wireless power transmitter 100 to be identified.

Or, in the negotiation phase or re-negotiation phase, the wireless power receiver 200 may transmit a GRQ packet (GRQ/cap) requesting a capability packet (CAP) of the wireless power transmitter 100 to the wireless power transmitter 100 (S1230). The message field of GRQ/cap may include the header value (0×31) of the capability packet (CAP).

The wireless power transmitter 100 that has received the GRQ/cap may transmit a capability packet (CAP) to the wireless power receiver 200 (S1235).

Or, in the negotiation phase or re-negotiation phase, the wireless power receiver 200 may transmit a GRQ packet (GRQ/xcap) requesting a capability packet (CAP) of the wireless power transmitter 100 to the wireless power transmitter 100 (S1240). The message field of GRQ/xcap may include the header value (0×32) of the performance packet (XCAP).

The wireless power transmitter 100 that has received GRQ/xcap may transmit a capability packet (XCAP) to the wireless power receiver 200 (S1245).

Figures 13, 14:
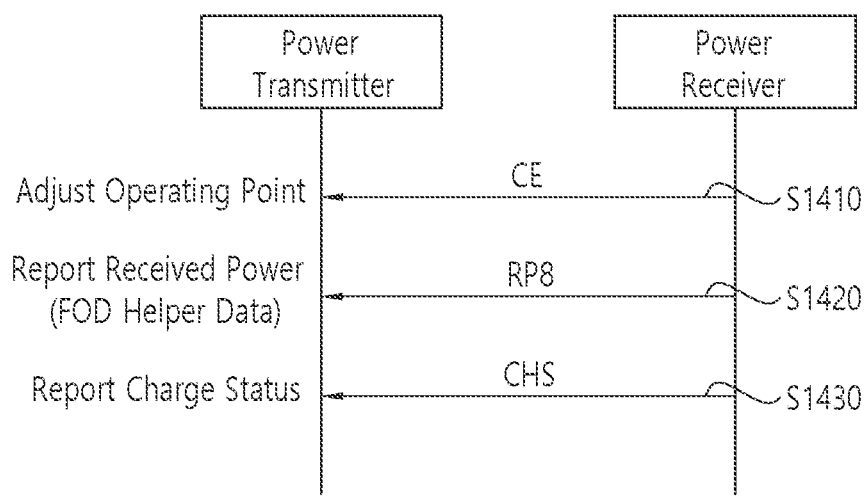
FIG. 13 is a diagram illustrating a message field of a capability packet (CAP) of a wireless power transmission device according to an embodiment.
FIG. 14 schematically shows a flow chart of the data flow for the power transfer phase 840 in the baseline protocol.

FIG. 13 is a diagram illustrating a message field of a capability packet (CAP) of a wireless power transmission device according to an embodiment.

A capability packet (CAP) according to one embodiment may have a header value of 0×31 and, referring to FIG. 13, may include a 3-byte message field.

Referring to FIG. 13, the message field of the capability packet (CAP) may include a 1-bit authentication (AR) flag and a 1-bit outband (OB) flag.

The authentication flag (AR) indicates whether the wireless power transmitter 100 supports the authentication function. For example, if the value of the authentication flag (AR) is '1', it indicates that the wireless power transmitter 100 supports an authentication function or can operate as an authentication responder, if the value of the authentication flag (AR) is '0', it may indicate that the wireless power transmitter 100 does not support the authentication function or cannot operate as an authentication responder.

The outband (OB) flag indicates whether the wireless power transmitter 100 supports outband communication. For example, if the value of the outband (OB) flag is '1', the wireless power transmitter 100 instructs outband communication, if the value of the out-of-band (OB) flag is 'O', this may indicate that the wireless power transmitter 100 does not support out-of-band communication.

In the negotiation phase, the wireless power receiver 200 can receive the capability packet (CAP) of the wireless power transmitter 100 and check whether the wireless power transmitter 100 supports the authentication function and whether out-band communication is supported.

Returning to FIG. 12, the wireless power receiver 200 can update the elements of the power transfer contract (Power Transfer Contract) related to the power to be provided in the power transfer phase using at least one specific request packet (SRQ, Specific Request data packet) in the negotiation phase or re-negotiation phase (S1250), ACK/NAK for this can be received (S1255).

Meanwhile, in order to confirm the extended power transfer contract and end the negotiation phase, the wireless power receiver 200 transmits SRQ/en to the wireless power transmitter 100 (S1260), it can receive ACK from the wireless power transmitter 100 (S1265).

4. Power Transfer Phase (840)

The power transfer phase 840 is a part of the protocol in which actual power is transferred to the load of the wireless power receiver 200. Here, power transfer may proceed according to the conditions of the power transfer contract created in the negotiation phase 830.

<Power Control Based on CE>

The wireless power receiver 200 can control the power level by transmitting control error (CE) data that measures the deviation between the target and the actual operating point of the wireless power receiver 200 to the wireless power transmitter 100. The wireless power transmitter 100 and wireless power receiver 200 aim to make the control error data zero, at which point the system will operate at the target power level.

<In-Power Transfer FOD Method>

In addition to control error data, the wireless power transmitter 100 and the wireless power receiver 200 may exchange information to facilitate FOD. The wireless power receiver 200 regularly reports the amount of power it receives (received power level) to the wireless power transmitter 100, the wireless power transmitter 100 may inform the wireless power receiver 200 whether a foreign object has been detected. Methods that can be used for FOD in the power transfer phase may correspond to, for example, power loss calculations. In this approach, the wireless power transmitter 100 compares the received power level reported by the wireless power receiver 200 with the amount of transmitted power (transmitted power level) and it can send a signal (whether a foreign object has been monitored) to the wireless power receiver 200 when the difference exceeds a threshold.

<Renegotiation Phase>

If necessary depending on the situation, the wireless power transmitter 100 or the wireless power receiver 200 may request renegotiation of the power transfer contract during the power transfer phase. Examples of changed circumstances in which renegotiation of a power transfer contract may occur include:

When the wireless power receiver 200 requires (substantially) more power than previously negotiated.

When the wireless power transmitter 100 detects that it is operating at low efficiency.

When the wireless power transmitter 100 can no longer maintain its current power level due to increased operating temperature (Or vice versa, i.e., when the wireless power receiver 200 can operate at a higher power level after sufficiently cooling).

Here, an example of a specific protocol for the renegotiation phase is the same as described above.

<Data Transport Stream>

The wireless power transmitter 100 and the wireless power receiver 200 may start a data transmission stream and exchange application level data throughout the power transfer phase 840.

Here, an important common application is authentication, where each side can verify the other's credentials in a tamper-proof manner. For example, the wireless power receiver 200 may want to check the credentials of the wireless power transmitter 100 to ensure that the wireless power transmitter 100 can be trusted to operate safely at high power levels. Having the appropriate credentials can mean you have passed compliance testing.

Accordingly, the present specification may provide a method of starting power transfer at a low power level and controlling power to a higher level only after successfully completing the authentication protocol.

<Protocol in Power Transfer Phase 840>

So far, the operation between the wireless power transmitter 100 and the wireless power receiver 200 in the power transfer phase 840 has been briefly described. Hereinafter, for a smooth understanding of the operation in the power transfer phase 840, the protocol in the power transfer phase 840 will be described separately as a baseline protocol and an extended protocol.

FIG. 14 schematically shows a flow chart of the data flow for the power transfer phase 840 in the baseline protocol.

According to FIG. 14, the wireless power receiver 200 may transmit CE to the wireless power transmitter 100 (S1410). Here, the wireless power receiver 200 can generally transmit CE data packets several times per second.

The wireless power receiver 200 may generally transmit a received power (RP) data packet (RP8 in the baseline protocol) to the wireless power transmitter 100 once every 1.5 seconds (S1420).

Optionally, the wireless power receiver 200 may transmit a charge status (CHS) data packet to the wireless power transmitter 100 (S1430).

The data packet described above can be summarized and explained as follows.

CE: CE data packets can provide feedback on the desired power level. CE data packets may include a control error value, here, the control error value may be a signed integer value that is a relative measurement value of the deviation between the actual operating point and the target operating point of the wireless power receiver 200. If the control error value at this time is a positive value, it indicates that the actual operating point is below the target operating point, the wireless power transmitter 100 may be requested to increase the power signal. If the control error value is a negative value, it indicates that the actual operating point is above the target operating point, the wireless power transmitter 100 may be requested to reduce the power signal.

RP8: RP8 data packets can report the received power level. Here, RP8 data packets can only be included in the baseline protocol.

CHS: CHS data packets can provide the charge level of the battery at the load.

Figure 15:
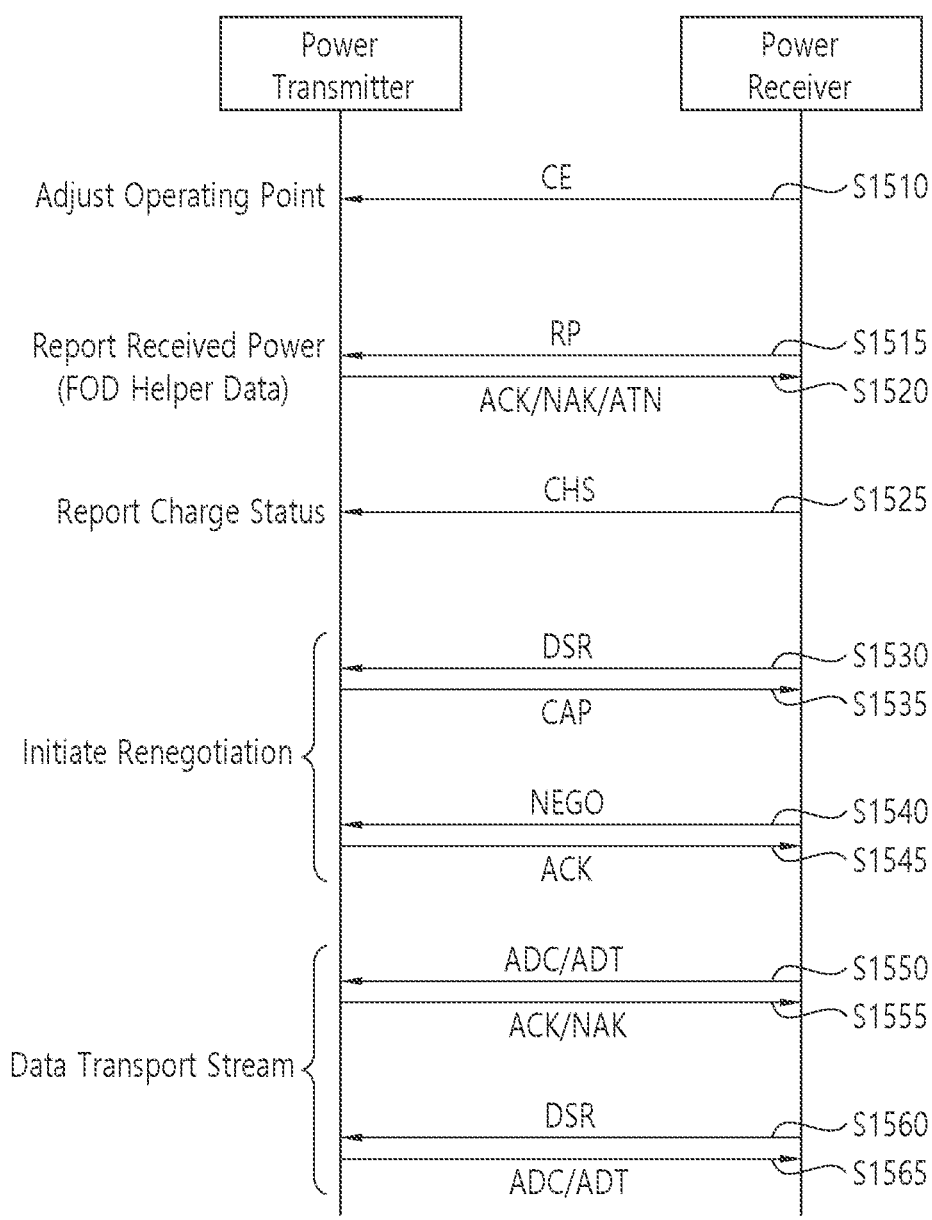
FIG. 15 schematically shows a flow chart of the data flow for the power transfer phase 840 in the extended protocol.

FIG. 15 schematically shows a flow chart of the data flow for the power transfer phase 840 in the extended protocol.

According to FIG. 15, the wireless power receiver 200 may transmit CE to the wireless power transmitter 100 (S1510). Here, the wireless power receiver 200 can generally transmit CE data packets several times per second.

The wireless power receiver 200 may generally transmit a received power (RP) data packet (RP in the extended protocol) to the wireless power transmitter 100 once every 1.5 seconds (S1515).

In the power transfer phase, control error packets (CE) and received power packets (RP) are data packets that must be repeatedly transmitted/received according to the required timing constraints to control wireless power.

The wireless power transmitter 100 can control the level of wireless power transmitted based on the control error packet (CE) and received power packet (RP) received from the wireless power receiver 200.

Meanwhile, in the extended protocol, the wireless power transmitter 100 may respond to the received power packet (RP) with a bit pattern such as ACK, NAK, or ATN (S1520).

The fact that the wireless power transmitter 100 responds with ACK to a received power packet (RP/0) with a mode value of 0 means that power transmission can continue at the current level.

When the wireless power transmitter 100 responds with NAK to a received power packet (RP/0) with a mode value of 0, this means that the wireless power receiver 200 must reduce power consumption.

For received power packets with a mode value of 1 or 2 (RP/1 or RP/2), when the wireless power transmitter 100 responds with ACK, this means that the wireless power receiver 200 has accepted the power correction value included in the received power packet (RP/1 or RP/2).

For received power packets with a mode value of 1 or 2 (RP/1 or RP/2), when the wireless power transmitter 100 responds with NAK, it means that the wireless power receiver 200 did not accept the power correction value included in the received power packet (RP/1 or RP/2).

The received power packet (RP/1) with a mode value of 1 described above may mean the first calibration data point, a received power packet (RP/2) with a mode value of 2 may mean an additional calibration data point. Here, the wireless power receiver may transmit a received power packet (RP/2) with a mode value of 2 to the wireless power transmitter multiple times to transmit a plurality of additional power calibration values, the wireless power transmitter can proceed with a calibration procedure based on the received RP/1 and multiple RP/2.

When the wireless power transmitter 100 responds with ATN to the received power packet (RP), it means that the wireless power transmitter 100 requests permission for communication. That is, the wireless power transmitter 100 may transmit an attention (ATN) response pattern to request permission to transmit a data packet in response to an RP data packet. In other words, the wireless power transmitter 100 may transmit an ATN to the wireless power receiver 200 in response to the RP data packet and request the wireless power receiver 200 for permission to transmit the data packet.

Optionally, the wireless power receiver 200 may transmit a charge status (CHS) data packet to the wireless power transmitter 100 (S1525).

Meanwhile, the wireless power transmitter 100 and the wireless power receiver 200 can exchange data stream response (DSR) data packets, CAP data packets, and NEGO data packets to initiate renegotiation of elements of the power transfer contract (typically guaranteed load power).

For example, the wireless power receiver 200 transmits a DSR data packet to the wireless power transmitter 100 (S1530), the wireless power transmitter 100 may transmit a CAP to the wireless power receiver 200 (S1535).

In addition, the wireless power receiver 200 transmits a NEGO data packet to the wireless power transmitter 100 (S1540), the wireless power transmitter 100 may transmit an ACK to the wireless power receiver 200 in response to the NEGO data packet (S1545).

Here, the data packets related to the start of the renegotiation phase can be summarized as follows.
  DSR: Any one of the following values can be set in the DSR data packet.
    i) 0x00-DSR/nak: Indicates that the last received data packet of the wireless power transmitter 100 was rejected.
    ii) 0x33-DSR/poll: Invite the wireless power transmitter 100 to send a data packet.
    iii) 0x55-DSR/nd: Indicates that the last received data packet from the wireless power transmitter 100 was not expected.
    iv) 0xFF-DSR/ack: Confirms that the last received data packet of the wireless power transmitter 100 has been properly processed.
  CAP: The CAP data packet provides information about the function of the wireless power transmitter 100. The specific details are the same as described previously.
  NEGO: NEGO data packets may request the wireless power transmitter 100 to proceed to the re-negotiation phase.

The wireless power transmitter 100 and the wireless power receiver 200 may use auxiliary data transport (ADC), auxiliary data transport (ADT), and DSR data packets to exchange application level data.

That is, from the perspective of transmission and reception of a data transmission stream for exchange of application-level data, the wireless power receiver 200 may transmit ADC/ADT to the wireless power transmitter 100 (S1550), the wireless power transmitter 100 may transmit an ACK/NAK to the wireless power receiver 200 in response (S1555). In addition, the wireless power receiver 200 can transmit DSR to the wireless power transmitter 100 (S1560), the wireless power transmitter may transmit ADC/ADT to the wireless power receiver (S1565).

Here, the data transport stream serves to transfer application-level data from the data stream initiator to the data stream responder. Additionally, application level data can be broadly divided into i) authentication applications, and ii) proprietary (general purpose) applications.

Among application level data, messages/information related to the authentication application can be organized as follows.

The message used in the authentication procedure is called an authentication message. Authentication messages are used to convey information related to authentication. There are two types of authentication messages. One is an authentication request, and the other is an authentication response. An authentication request is sent by an authentication initiator, and an authentication response is sent by an authentication responder. The wireless power transmitting device and receiving device can be an authentication initiator or an authentication responder. For example, if the wireless power transmitting device is the authentication initiator, the wireless power receiving device becomes the authentication responder, and if the wireless power receiving device is the authentication initiator, the wireless power transmitting device becomes the authentication responder.

Authentication request messages include GET_DIGESTS, GET_CERTIFICATE, and CHALLENGE.
  GET_DIGESTS: This request can be used to retrieve certificate chain digests. The wireless power receiver 200 can request a desired number of digests at a time.
  GET_CERTIFICATE: This request can be used to read segments of the target certificate chain.
  CHALLENGE: This request can be used to initiate authentication of a power transmitter product device.

The authentication response message includes DIGESTS, CERTIFICATE, CHALLENGE_AUTH, and ERROR.
  DIGESTS: The wireless power transmitter 100 can send a certificate chain summary using the DIGESTS response and report slots containing a valid certificate chain summary.
  CERTIFICATE: This response can be used by the wireless power transmitter 100 to send the requested segment of the certificate chain.

CHALLENGE_AUTH: The wireless power transmitter 100 can respond to the CHALLENGE request using CHALLENGE_AUTH.

ERROR: This response can be used to transmit error information from the power transmitter.

The authentication message may be called an authentication packet, authentication data, or authentication control information. Additionally, messages such as GET_DIGEST and DIGESTS may also be called GET_DIGEST packets, DIGEST packets, etc.

Meanwhile, as described above, the wireless power receiver 200 and the wireless power transmitter 100 can transmit application level data through a data transmission stream. Application-level data transmitted through a data transport stream may consist of a data packet sequence with the following structure.

Initial ADC data packet that opens the stream.
i) Types of messages contained in the stream.
ii) Number of data bytes in the stream.
A series of ADT data packets containing the actual message.
The final ADC/end data packet that closes the stream.

Hereinafter, the data transport stream for an example in which the above ADC, ADT, and ADC/end data packets are used will be described using the drawings.

Figure 16:
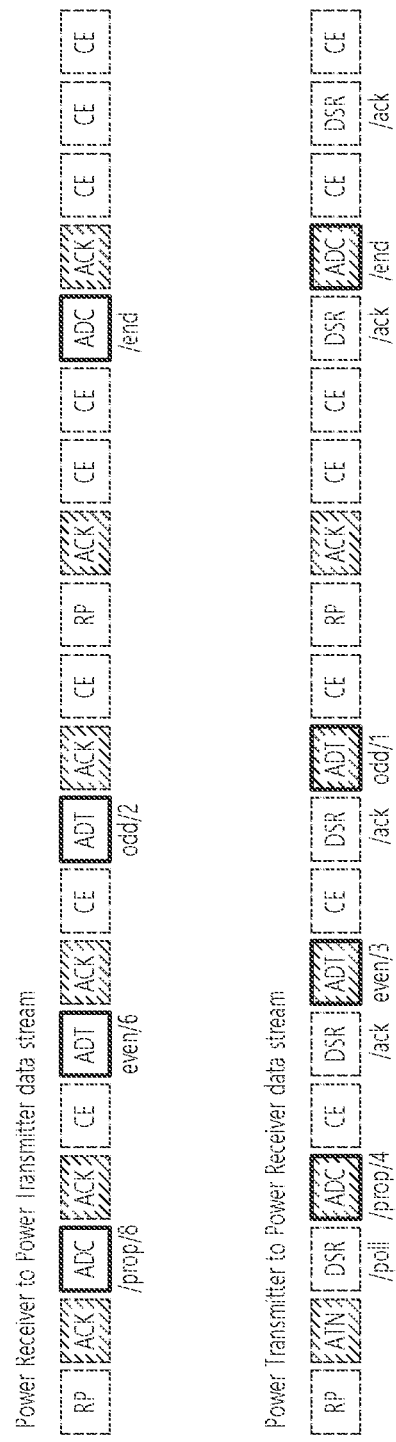
FIG. 16 illustrates an application-level data stream between the wireless power transmitter 100 and the wireless power receiver 200 according to an example.

FIG. 16 illustrates an application-level data stream between the wireless power transmitter 100 and the wireless power receiver 200 according to an example.

Referring to FIG. 16, the data stream may include auxiliary data control (ADC) data packets and/or auxiliary data transport (ADT) data packets.

ADC data packets are used to open a data stream. ADC data packets can indicate the type of message included in the stream and the number of data bytes. On the other hand, ADT data packets are sequences of data containing the actual message. ADC/end data packets are used to signal the end of a stream. For example, the maximum number of data bytes in a data transport stream may be limited to 2047.

ACK or NAC (NACK) is used to notify whether ADC data packets and ADT data packets are normally received. Between the transmission timing of the ADC data packet and the ADT data packet, control information necessary for wireless charging, such as a control error packet (CE) or DSR, may be transmitted.

Using this data stream structure, authentication-related information or other application-level information can be transmitted and received between a wireless power transmitter and a receiver.

An example for understanding the operation between the wireless power transmitter 100 and the wireless power receiver 200 in the power transfer phase 840 described above may be as follows.

Figure 17:
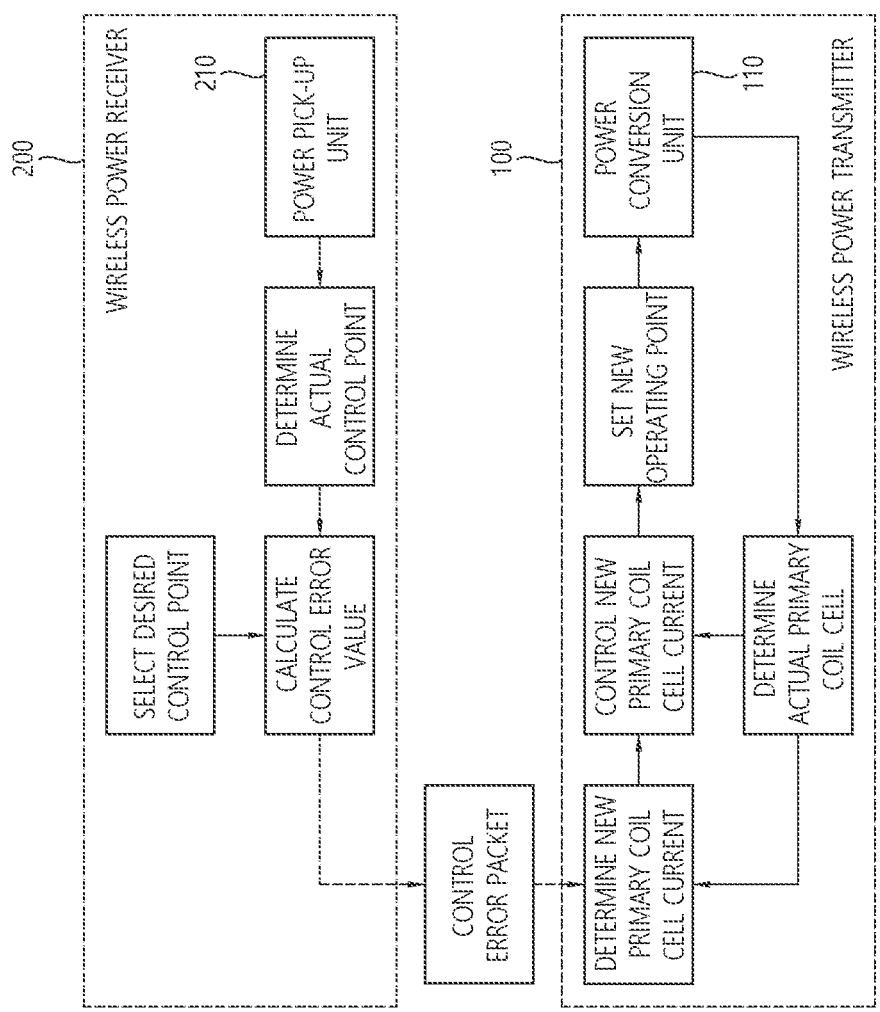
FIG. 17 shows a power control method according to one embodiment.

FIG. 17 shows a power control method according to one embodiment.

In the power transfer phase in FIG. 17, the wireless power transmitter 100 and the wireless power receiver 200 can control the amount of power transferred by performing communication along with power transmission and reception. The wireless power transmitter and wireless power receiver operate at a specific control point. The control point represents the combination of voltage and current provided from the output of the wireless power receiver when power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point-amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 17 will not be completely excluded. And, additional control of the transmitted power may be performed by using the method of FIG. 17.

Hereinafter, this Specification Will be Described in More Detail.

Wireless charging methods include a magnetic induction method using a magnetic induction phenomenon between a primary coil and a secondary coil, and a magnetic resonance method in which magnetic resonance is achieved using a frequency in a band of several tens of kHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

The standards in WPC define a baseline power profile (BPP) and an extended power profile (EPP). Hereinafter, BPP and EPP will be described respectively.

A. Baseline Power Profile (BPP)

BPP relates to a power transfer profile between a wireless power transmitter and receiver that supports power transfer of up to 5W. And, in BPP, unidirectional communication from a wireless power receiver to a wireless power transmitter is supported. The communication method at this time may correspond to ASK (amplitude shift keying). In BPP, there may be protocol phases of ping, configuration, and power transfer.

B. Extended Power Profile (EPP)

EPP relates to a power transfer profile between a wireless power transmitter and receiver that supports power transfer of up to 15W. And, in EPP, bidirectional communication between a wireless power receiver and a wireless power transmitter is supported. The communication method from the wireless power receiver to the wireless power transmitter may correspond to ASK (amplitude shift keying), the communication method from the wireless power transmitter to the wireless power receiver may correspond to frequency shift keying (FSK). In EPP, there may be protocol phases of ping, setup, negotiation, and power transfer.

(a) Compatibility in EPP

EPP may correspond to a higher profile of BPP.

For example, if a BPP wireless power receiver is placed on an EPP wireless power transmitter, the EPP wireless power transmitter can operate as a BPP wireless power transmitter.

For example, if the EPP wireless power receiver is placed on a BPP wireless power transmitter, the EPP wireless power receiver can operate as a BPP wireless power receiver.

In other words, EPP can maintain compatibility with BPP.

(b) EPP Indication Method of EPP Wireless Power Receiver

The EPP wireless power receiver can indicate that it is an EPP wireless power receiver by setting the 'neg' bit in the configuration packet (i.e. CFG) to 1. Specific examples of configuration packets are as described above.

(c) EPP Indication Method of EPP Wireless Power Transmitter

When the EPP wireless power transmitter receives a configuration packet with the 'neg' bit set to 1 from the wireless power receiver, the EPP wireless power transmitter may respond to the wireless power receiver with an ACK FSK bit pattern.

For reference, as previously explained, the BPP wireless power transmitter does not support the FSK communication method, so the BPP wireless power transmitter cannot transmit FSK bit patterns. Accordingly, by not receiving the above ACK response, the EPP wireless power receiver, which sets the 'neg' bit to 1 and transmits a configuration packet to the BPP wireless power transmitter, can identify the other wireless power transmitter as a BPP wireless power transmitter.

Meanwhile, the wireless power transfer system seeks to provide a new power transfer profile, among the power transfer profiles proposed at this time, there is MPP (magnetic power profile). MPP may correspond to a proprietary extension from Apple based on Qi v1.3.0.

C. Magnet Power Profile (MPP)

MPP relates to a power transfer profile between a wireless power transmitter and receiver that supports power transfer of up to 15W. And, in MPP, bidirectional communication between a wireless power receiver and a wireless power transmitter is supported. The communication method from the wireless power receiver to the wireless power transmitter may correspond to ASK (amplitude shift keying), the communication method from the wireless power transmitter to the wireless power receiver may correspond to frequency shift keying (FSK). At this time, fast FSK (NCYCLE=128) can be used during the negotiation and power transfer phase.

In MPP, there may be protocol phases of ping, configuration, MPP negotiation, and MPP power transfer.

(a) Compatibility in MPP

MPP may correspond to a higher profile of BPP.

For example, if a BPP wireless power receiver is placed on an MPP wireless power transmitter, the MPP wireless power transmitter can operate as a BPP wireless power transmitter.

For example, if the MPP wireless power receiver is placed on a BPP wireless power transmitter, the MPP wireless power receiver can operate as a BPP wireless power receiver.

In other words, MPP can maintain compatibility with BPP.

(b) MPP Operation of MPP Wireless Power Receiver (MPP Instruction Method)

The MPP wireless power receiver may use a specific MPP indicator within the extended ID packet.

In order for the MPP wireless power receiver to indicate whether MPP is supported through XID, the wireless power receiver must inform the wireless power transmitter that the XID is transmitted through an ID packet. The ID packet transmitted by the MPP wireless power receiver may be as follows.

FIG. 18 schematically shows the structure of an MPP ID packet.

According to FIG. 18, in the MPP ID packet, the value of the major version field from b4 to b7 of B0 may be set to 1.

In the MPP ID packet, the value of the minor version field from b0 to b3 of B0 may be a value to be determined later.

In the MPP ID packet, the values of the manufacturer codes of B1 and B2 may be assigned as PRMC codes.

In the MPP ID packet, the value of the 'ext' field of b7 of B3 may be set to 1 to indicate that an XID packet is additionally transmitted.

In the MPP ID packet, the values of the random identifier fields of b0 to b6 of B3 and b3 to b7 of B4 and B5 may be set according to a random device identification policy.

FIG. 19 schematically shows an example of an XID packet in MPP.

According to FIG. 19, an XID packet in MPP may include an 'XID Selector' field, a 'Restricted' field, and a 'Freq Mask' field.

Here, whether MPP is supported can be determined depending on whether the value of 'XID selector' is 0xFE. That is, if the value of B_0 of the XID is 0xFE, the XID at this time may correspond to information indicating that the wireless power receiver supports MPP.

The 'Restricted' field may correspond to information indicating whether the wireless power receiver operates in MPP restricted mode or MPP full mode. If the wireless power receiver selects to operate in MPP limited mode, the above field can be set to 1. Meanwhile, in other cases (e.g., when the wireless power receiver selects not to operate in MPP limited mode), the above field may be set to 0.

The 'Preferred Frequency' field may mean the MPP preferred frequency. Here, if the wireless power receiver wishes to retrieve information from the wireless power transmitter before switching the frequency (in the negotiation phase), this field can be set to 128 kHz. Otherwise, the wireless power receiver can set this field to 360 kHz.

The 'Freq Mask' field corresponds to a field for determining whether the operating frequency of 360 kHz is supported. That is, if the 'Freq Mask' field is set to 0, 360 kHz is supported.

In summary, the wireless power transmitter determines whether the 'Ext' bit of the ID received from the wireless power receiver is set to 1 and determines whether B_0 of the XID is set to 0xFE, the wireless power transmitter can determine whether the wireless power receiver supports MPP.

(c) MPP Operation of MPP Wireless Power Transmitter (MPP Instruction Method)

After detecting the placement of a wireless power receiver on the charging surface, the MPP wireless power transmitter can use the information contained in the ID and XID packets to perform a digital ping and identify the receiver.

Here, the wireless power transmitter may determine that the wireless power receiver supports MPP if all of the following conditions are met.

Qi version: The Qi protocol version of the ID packet is set to (Major=1, Minor-TBD) or higher.

MPP support notification: The subheader (byte 0) of the XID packet is set to the MPP selector.

If the above two conditions are not satisfied, the wireless power transmitter can proceed with subsequent procedures according to the Qi v1.3 specification.

Meanwhile, according to the MPP operation mode requested by the MPP wireless power receiver in the XID packet, the wireless power transmitter performs the following.

Restricted profile activation (MPP restricted mode): When the 'restricted' flag is set to 1.

Full profile activation (MPP full mode): when the 'restricted' flag is set to 0.

Specific examples of the above limited profile and full profiles will be described later.

Meanwhile, when the MPP wireless power transmitter receives a configuration packet with the 'neg' bit set to 1 from the wireless power receiver, the MPP wireless power transmitter (in MPP full mode) may respond to this to the wireless power receiver with an MPP ACK FSK bit pattern.

For reference, the wireless power transmitter in MPP restricted mode does not support the FSK communication method, so the wireless power transmitter in MPP restricted mode cannot transmit FSK bit patterns. However, because the wireless power transmitter in MPP restricted mode uses a 360 kHz operation signal to transmit power, accordingly, the MPP wireless power receiver setting the 'neg' bit to 1 and transmitting the configuration packet to the wireless power transmitter operating in MPP restricted mode allows the other wireless power transmitter to be identified as an MPP restricted mode wireless power transmitter through the operating frequency.

(d) Mode of MPP

Meanwhile, two modes may exist in MPP. One of them is MPP restricted mode (MPP Restricted mode) (in other words, MPP baseline profile), and the other one is MPP Full mode (in other words, MPP full profile).

To briefly explain the difference between the two, in MPP restricted mode, the 'restricted' field in the XID is set to 1, but in MPP full mode, the 'restricted' field in the XID is set to 0.

Additionally, FSK communication is not supported in MPP restricted mode, but FSK communication can be supported in MPP full mode.

Additionally, since FSK communication is not supported in MPP restricted mode, MPP ACK for CFG cannot be transmitted, accordingly, MPP negotiation is not supported in MPP restricted mode. On the other hand, in MPP full mode, FSK communication is supported, so MPP ACK for CFG can be transmitted, accordingly, MPP negotiation can be supported in MPP full mode.

Below, MPP restricted mode and MPP full mode will be described in more detail. Here, MPP restricted mode can be mixed with the MPP baseline profile, and MPP full mode can be mixed with the MPP full profile.

Below, for a better understanding of MPP restricted mode and MPP full mode, the protocols in each mode will be explained in more detail.

i) MPP Restricted Mode

As explained previously, FSK communication is not supported in MPP restricted mode. That is, in MPP restricted mode, there may be no data packets transmitted from the wireless power transmitter to the wireless power receiver. Against this background, the protocol in MPP restricted mode will be explained through drawings.

FIG. 20 schematically shows the protocol in MPP restricted mode.

According to FIG. 20, the wireless power receiver may transmit a SIG to the wireless power transmitter on a first operating frequency (e.g., 128 kHz). At this time, the first operating frequency may correspond to an operating frequency at which BPP and/or EPP can be performed. And, the first operating frequency at this time corresponds to the frequency at which the wireless power transmitter operates.

The wireless power receiver may transmit an ID packet to the wireless power transmitter on a first operating frequency. At this time, since the XID is always transmitted in MPP, the 'ext' bit of the ID may be set to 1 to indicate that the XID is additionally transmitted.

The wireless power receiver may transmit an XID packet to the wireless power transmitter on a first operating frequency.

At this time, the value of B0 in the XID may be 0xFE, and if the value of B0 in the XID is set to 0xFE, this may correspond to information indicating that the wireless power receiver supports MPP. In addition, the 'Restricted' field in the XID at this time may be set to 1 to indicate that the wireless power receiver operates in MPP restricted mode.

Here, when the wireless power transmitter receives the above XID packet indicating MPP restricted mode, the wireless power transmitter may remove the power signal and restart the ping phase at a new operating frequency.

When the ping phase is restarted, the wireless power receiver begins transmitting the SIG again. However, the operating frequency at this time may be a second operating frequency (e.g., 360 kHz).

Thereafter, the wireless power receiver transmits ID, XID, and CFG packets to the wireless power transmitter at the second operating frequency, respectively. In addition, the wireless power receiver can receive wireless power based on the MPP baseline from the wireless power transmitter by transmitting a CEP to the wireless power transmitter.

ii) MPP Full Mode

As described previously, FSK communication can be supported in MPP full mode. That is, in MPP full mode, there may be data packets transmitted from the wireless power transmitter to the wireless power receiver. In other words, MPP negotiation, etc. may be conducted between a wireless power transmitter and a wireless power receiver. Against this background, the protocol in MPP full mode will be explained through the drawings.

Figure 21:
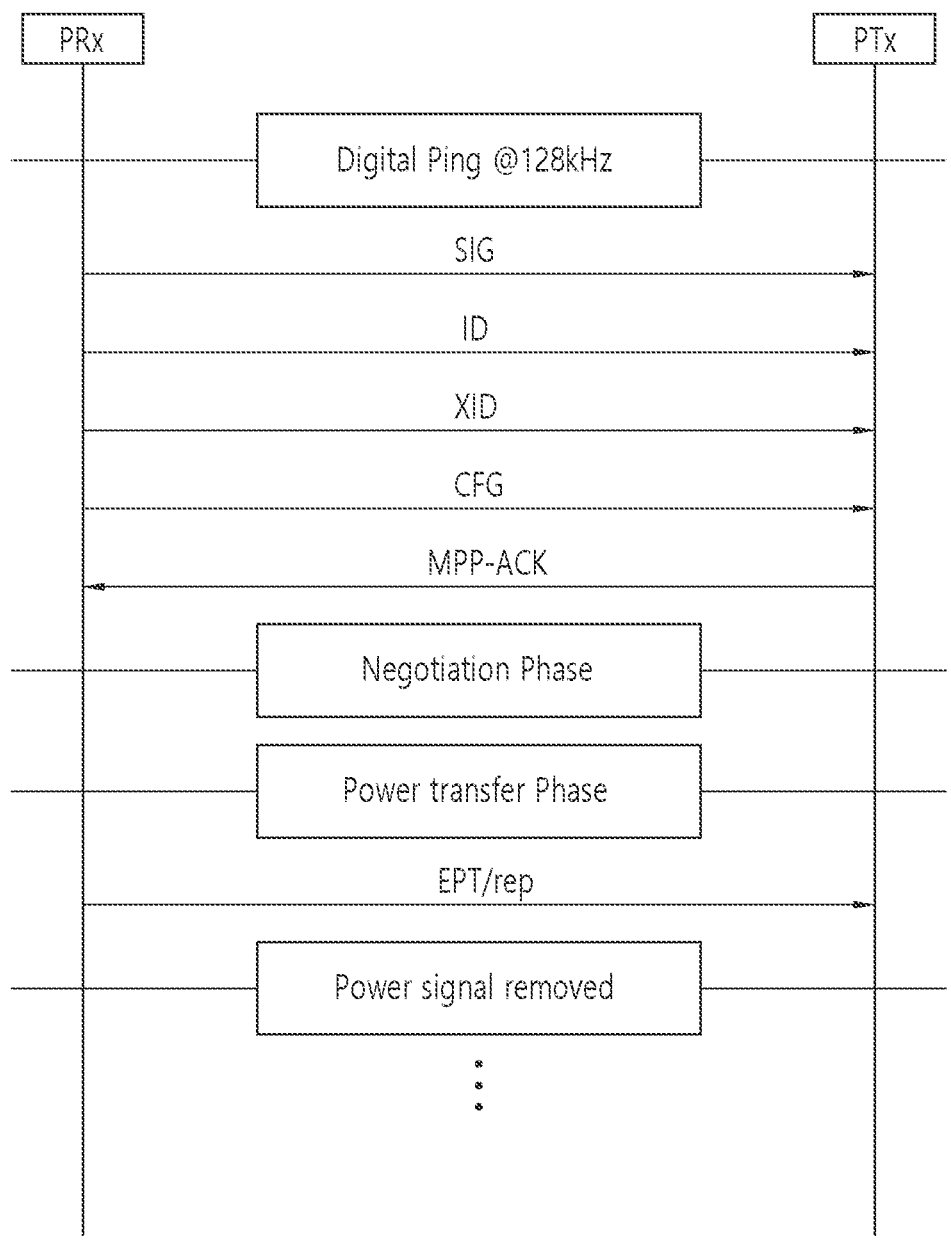
FIGS. 21 and 22 schematically show the protocol in MPP full mode.
Figure 22:
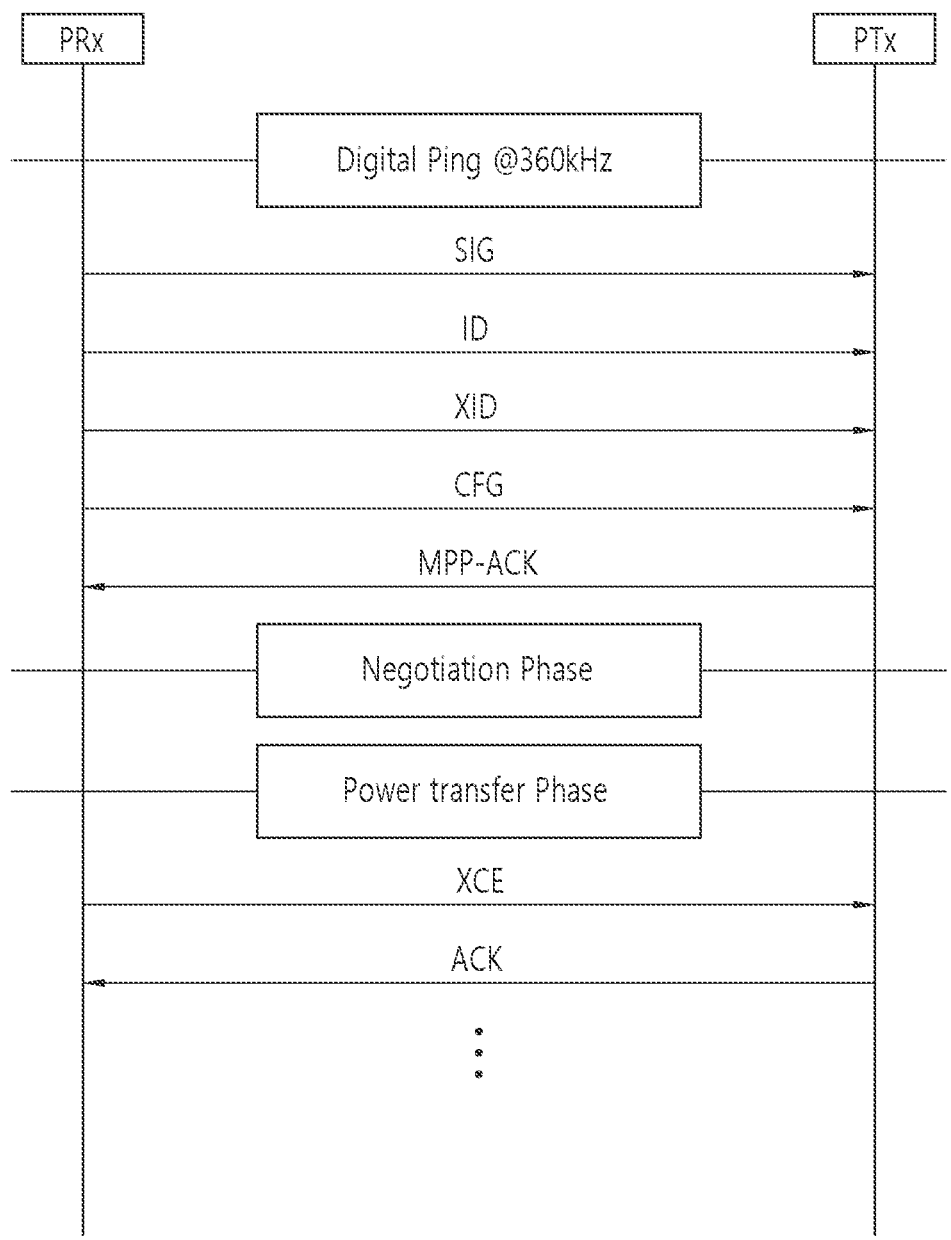

FIGS. 21 and 22 schematically show the protocol in MPP full mode.

First, according to FIG. 21, the wireless power receiver may transmit a SIG to the wireless power transmitter on a first operating frequency (e.g., 128 kHz). At this time, the first operating frequency may correspond to an operating frequency at which BPP and/or EPP can be performed. And, the first operating frequency at this time corresponds to the frequency at which the wireless power transmitter operates.

The wireless power receiver may transmit an ID packet to the wireless power transmitter on a first operating frequency. At this time, since the XID is always transmitted in MPP, the 'ext' bit of the ID may be set to 1 to indicate that the XID is additionally transmitted.

The wireless power receiver may transmit an XID packet to the wireless power transmitter on a first operating frequency.

At this time, the value of B0 in the XID may be 0xFE, and if the value of B0 in the XID is set to 0xFE, this may correspond to information indicating that the wireless power receiver supports MPP. In addition, the 'Restricted' field in the XID at this time may be set to 0 to indicate that the wireless power receiver operates in MPP full mode.

Meanwhile, in MPP full mode, unlike MPP restricted mode, the power signal is not removed even if the wireless power transmitter receives an XID packet from the wireless power receiver. At this time, since the power signal has not yet been removed, the wireless power receiver transmits a CFG packet to the wireless power transmitter after the XID packet.

And, the wireless power receiver can receive an MPP ACK from the wireless power transmitter as a response to the above CFG packet.

The wireless power receiver that receives the MPP ACK enters a negotiation phase with the wireless power transmitter, and both the wireless power receiver and the wireless power transmitter can proceed with negotiation.

After negotiation progresses, the wireless power receiver may enter a power transfer phase with the wireless power transmitter.

Meanwhile, the wireless power receiver transmits an EPT packet to the wireless power transmitter. The wireless power transmitter that receives the EPT packet removes the power signal and can then restart the ping phase at a new operating frequency.

According to FIG. 22, when the ping phase is restarted, the wireless power receiver starts again from transmitting the SIG. However, the operating frequency at this time may be a second operating frequency (e.g., 360 kHz).

Thereafter, the wireless power receiver transmits ID, XID, and CFG packets to the wireless power transmitter at the second operating frequency, respectively. And, the wireless power receiver can receive the MPP ACK from the wireless power transmitter.

The wireless power receiver that receives the MPP ACK enters a negotiation phase with the wireless power transmitter at the second operating frequency, and both the wireless power receiver and the wireless power transmitter can proceed with negotiation.

After negotiation, the wireless power receiver enters a power transfer phase with the wireless power transmitter at the second operating frequency. In addition, the wireless power receiver may receive wireless power based on the MPP full mode from the wireless power transmitter by transmitting an XCE to the wireless power transmitter and responding (e.g., receiving an ACK).

Hereinafter, this Specification Will be Described in More Detail.

As described above, in a wireless power transmission system, the format of a data transport stream that can transmit and receive an application-level data stream between a wireless power transmitter and a wireless power receiver is defined.

At this time, the format of the data transport stream (in other words, data stream) can be defined by the following packets.

Initial ADC data packet opening the stream

Here, the above ADC data packet may indicate the type of message included in the stream.

And, the above ADC data packet can indicate the number of data bytes included in the stream.

Sequence of ADT data packets containing the actual message

Final ADC/end data packet closing the stream

In other words, in relation to data transport stream transmission, the following packets may be defined.

About data streams: ADC and/or ADT (wireless power transmitter and wireless power receiver)

Regarding responses to ADC and ADT: DSR (wireless power receiver), ACK/NAK/ND/ATN (wireless power transmitter)

Here, ADC may be a packet sent by a wireless power transmitter, and ADC may be a packet sent by a wireless power receiver. As an example, the ADC packet of the wireless power transmitter is described in more detail as follows.

FIG. 23 schematically shows an example of an ADC packet.

According to FIG. 23, ADC data packets can control the transmission of a data transport stream to a power receiver. At this time, the ADC packet may include a request field and a parameter field. And, each field at this time may be as follows.

Request field: Any one of the values below can be set.

0-ADC/end: Closes the outgoing data transmission stream to the wireless power receiver.

2-ADC/auth: Opens the authentication data transmission stream to the wireless power receiver.

5-ADC/rst: Resets all incoming and outgoing data transport streams.

0×10 . . . 0×1F-ADC/prop: Opens a proprietary data transmission stream to the wireless power receiver.

And the parameter field can be as follows.

Parameter field: For proprietary (ADC/prop) and authenticated (ADC/auth) data transport streams, the number of data bytes in the stream. It may be set to 0 for all other ADC data packets.

The subsequent DSR data packet may be as follows.

DSR/ack: The wireless power receiver successfully executed the request.

DSR/nak: The wireless power receiver did not execute the request because the incoming and/or outgoing data transport streams are already open or in use.

DSR/nd (Open Data Transport Stream): The wireless power receiver does not support the requested data transport stream type.

DSR/nd (reserved Request value): The wireless power receiver does not support the request.

DSR/poll: The wireless power receiver did not receive the last power transmitter data packet.

In other words, DSR/poll is a packet sent from a wireless power receiver to a wireless power transmitter. DSR/poll may mean authorizing a wireless power transmitter to send a certain packet (a packet that is to be sent following an existing packet or a packet that is about to be sent). That is, as described above, DSR/poll can invite the wireless power transmitter to transmit any data packet.

Meanwhile, ADT may also be a packet sent by a wireless power transmitter, and ADT may be a packet sent by a wireless power receiver. As an example, the ADT packet of the wireless power transmitter is described in more detail as follows.

FIG. 24 schematically shows an example of an ADT packet.

According to FIG. 24, ADT data packets convey application data in the data transport stream to the power receiver. Here, ADT data packet sizes from 1 to 7 can be used.

At this time, ADT data packets for each size can be used with odd and even headers. For example, assuming that the size of the ADT data packet is 7 bytes, there may be a 7-byte ADT data packet with an odd header and a 7-byte ADT data packet with an even header.

Here, the ADT packet may include a data field, and the data field may be as follows.

Data fields: Can be appropriately defined by the application layer.

The subsequent DSR data packet may be as follows.

DSR/ack: The wireless power receiver processed the data in the packet correctly.

DSR/nak: The wireless power receiver received the last power transmitter data packet, but was unable to process the data in the packet. For example, a wireless power receiver may use this response if it is busy or cannot buffer data.

DSR/nd: Wireless power receiver does not have incoming data transport stream open.

DSR/poll: The wireless power receiver did not receive the last power transmitter data packet.

In other words, DSR/poll is a packet sent from a wireless power receiver to a wireless power transmitter. DSR/poll may mean authorizing a wireless power transmitter to send a certain packet (a packet that is to be sent following an existing packet or a packet that is about to be sent). That is, as described above, DSR/poll can invite the wireless power transmitter to transmit any data packet.

Meanwhile, the data transport stream (hereinafter referred to as TPL) can be divided into an initiator and a responder regardless of the wireless power receiver/wireless power transmitter.

At this time, the contents of the data transmission stream and the packets related thereto exchanged between the initiator and the responder will be explained through the drawings.

Figure 25:
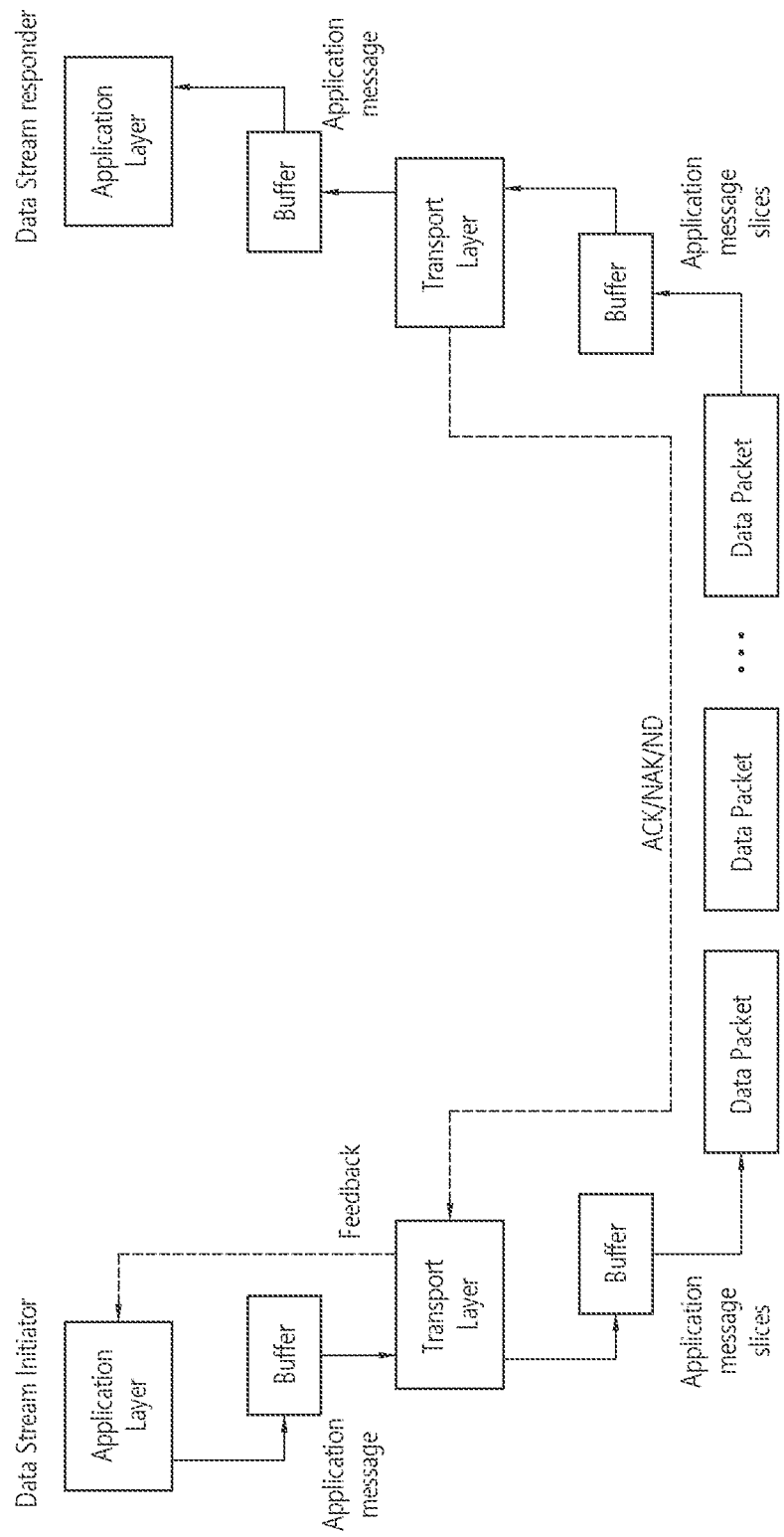
FIG. 25 schematically shows an example in which an application message is transmitted from a data stream initiator to a data stream responder.

FIG. 25 schematically shows an example in which an application message is transmitted from a data stream initiator to a data stream responder.

According to FIG. 25, the initiator sends a data message to the responder.

More specifically, targeting specific applications (e.g., Authentication), the initiator sends an application request message.

To do this, the data stream initiator can first create a request message related to the application in the application layer and store it in the buffer. And the data stream initiator can deliver the buffer request message to the transport layer and store it in the local buffer. In the transport layer of the data stream initiator, the application request message stored in the local buffer can be sliced according to the ADT size and then delivered to the data stream responder through the data stream.

Whenever the data stream responder receives a sliced application request message from the initiator through ADT, etc., the data stream responder may perform a response (ACK/NAK/ND). And, the data stream responder can sequentially store the received sliced messages in its local buffer.

When the data stream initiator sends all application request messages and closes the data stream, it can provide feedback to (its) application layer. Then, the data stream responder can complete the received application request message and then deliver it to the application layer of the data stream responder.

When the application request message is delivered to the application layer of the data stream responder through this process, the data stream initiator has completed delivering the application request message. And, the data stream responder corresponds to the completion of receiving the application request message.

Afterwards, the positions of the data stream initiator and the data stream responder are switched. That is, the new data stream initiator can deliver an application response message (to the application request message) to the new data stream responder. And, the delivery process of the application response message can be repeated as described above (i.e., the new data stream initiator slices the application response message and passes it through the data stream (e.g. ADT, etc.) to the new data stream responder).

Here, the same process as above, that is, an example where the existing data stream initiator is converted to a new data stream responder and the existing data stream responder is converted to a new data stream initiator can be explained through drawings from an application perspective as follows.

Figure 26:
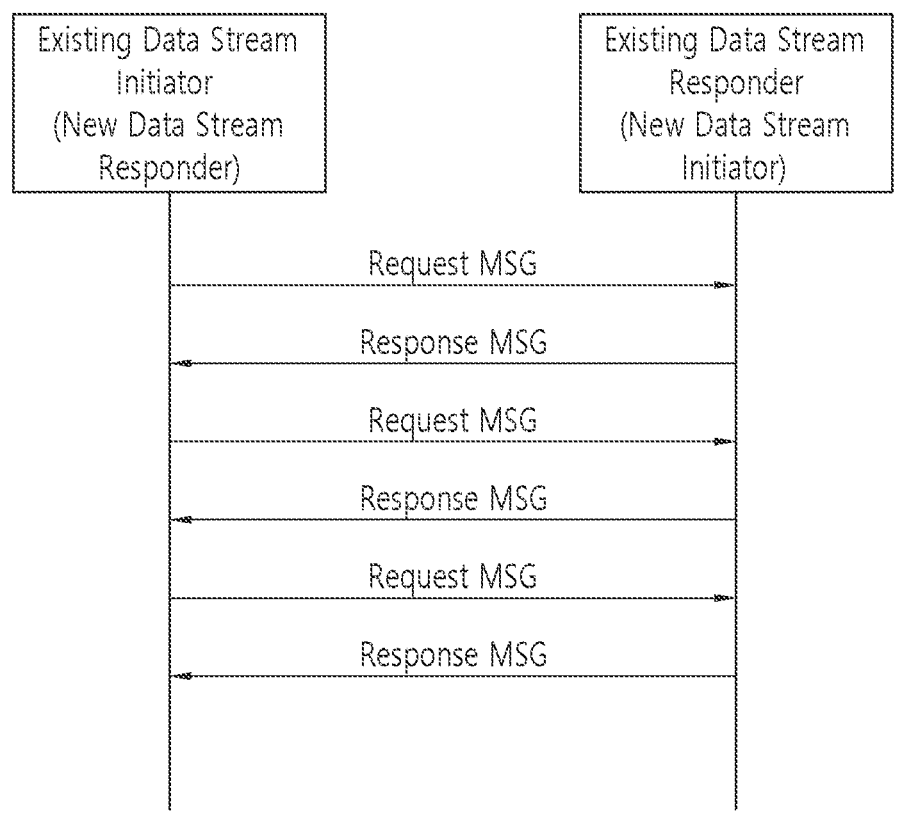
FIG. 26 schematically shows a flowchart for data transmission from an application perspective.

FIG. 26 schematically shows a flowchart for data transmission from an application perspective.

According to FIG. 26, the data stream initiator may send an (application) request message to the data stream responder. At this time, the method by which the data stream initiator transmits the (application) request message to the data stream responder is the same as described above. That is, as shown in FIG. 25, the data stream initiator can slice the request message and transmit it to the data stream responder through a data stream (e.g., ADT packet, etc.).

Afterwards, the data stream responder that receives the (application) request message switches to a new data stream initiator. That is, when the data stream responder receives the final ADC packet from the data stream initiator, which is the packet for closing the data stream associated with the application request message, a data stream responder can switch to a data stream initiator.

Thereafter, the new data stream initiator may transmit an application response message to the existing data stream initiator through the data stream (e.g., ADT packet, etc.). At this time, the existing data stream initiator can become a new data stream responder.

Meanwhile, since the wireless power transmission system is a system developed with a focus on wireless power transmission, various problematic situations may occur in data communication between the wireless power transmitter and the wireless power receiver.

Examples of problem situations that may occur when data communication (i.e., TPL communication) between a wireless power transmitter and a wireless power receiver are performed can be summarized and explained as follows.

During TPL communication, if it is impossible for the initiator and/or responder to store the data sent/received by the initiator (wireless power transmitter or wireless power receiver) and/or responder (wireless power receiver or wireless power transmitter) (e.g. memory stuck).

During TPL communication, when the communication synchronization between the two is out of sync, the initiator and/or responder are waiting for the other party's response.

During TPL communication, inband communication is stuck because inband communication cannot be performed due to charging control-related work.

When communication between the initiator and/or responder no longer proceeds due to an unknown error during TPL communication.

When a problem occurs with the buffer of the transport layer during TPL communication, TPL cannot proceed.

etc.

Here, if a problem as described above occurs while the wireless power transmitter and/or wireless power receiver is performing data communication with the other party, it may be desirable for the wireless power transmitter and/or wireless power receiver to reset or force termination (in other words, abort) this data communication.

For example, with at least one data stream open, if the above problem occurs and it is no longer possible to send and receive data streams, the wireless power transmitter and/or wireless power receiver may wish to perform a reset of the data stream.

One way to implement this is for the wireless power transmitter and/or wireless power receiver to send information about the reset to the other party and close all data streams. However, this method corresponds to a method that does not consider multi-data streams.

For example, when a problem occurs in data storage/communication while various application data streams (e.g. stream 1: authentication; stream 2: configuration; stream 3: BMS) are in progress (or if a problem occurs in the transport layer), there may be cases where there are no problems with other streams (stream 1 and stream 3) except for the stream in which the problem occurred (as an example, assume that a problem occurred in stream 2).

In this case, if a reset is performed by applying the previous implementation method, a reset can also be performed on other streams (e.g. stream 1 and stream 3) that are not problematic. In this case, the wireless power transmitter and/or wireless power receiver may have to perform data communication from the beginning again, even for streams that do not have problems. This may be an inefficient method.

Also, for example, with at least one data stream open, when the above problem occurs and it is no longer difficult to transmit and receive a data stream, the wireless power transmitter and/or wireless power receiver may want to perform a forced termination rather than a reset of the data stream.

By way of example, while performing data communication between a wireless power transmitter and/or a wireless power receiver, a problem as described above may occur and a reset of data communication is requested from the other party, but the data communication reset may fail. In cases like this, it may be impossible to perform data communication with the other party anymore, the wireless power transmitter and/or wireless power receiver may wish to perform forced termination of data communication rather than resetting the data stream.

However, in the case of current technology, it does not provide a configuration for forced termination of data communication, as described above, it may be impossible for the wireless power transmitter and/or wireless power receiver to forcibly terminate data communication.

Accordingly, the present specification seeks to provide a method for resetting a data stream and a device using the same. In addition, the present specification seeks to provide a method for forcibly terminating (aborting) a data stream and a device using the same.

1. Reset of Data Stream

The following drawings were prepared to explain a specific example of the present specification. Since the names of specific devices or specific signals/messages/fields described in the drawings are provided as examples, the technical features of this specification are not limited to the specific names used in the drawings below.

Figure 27:
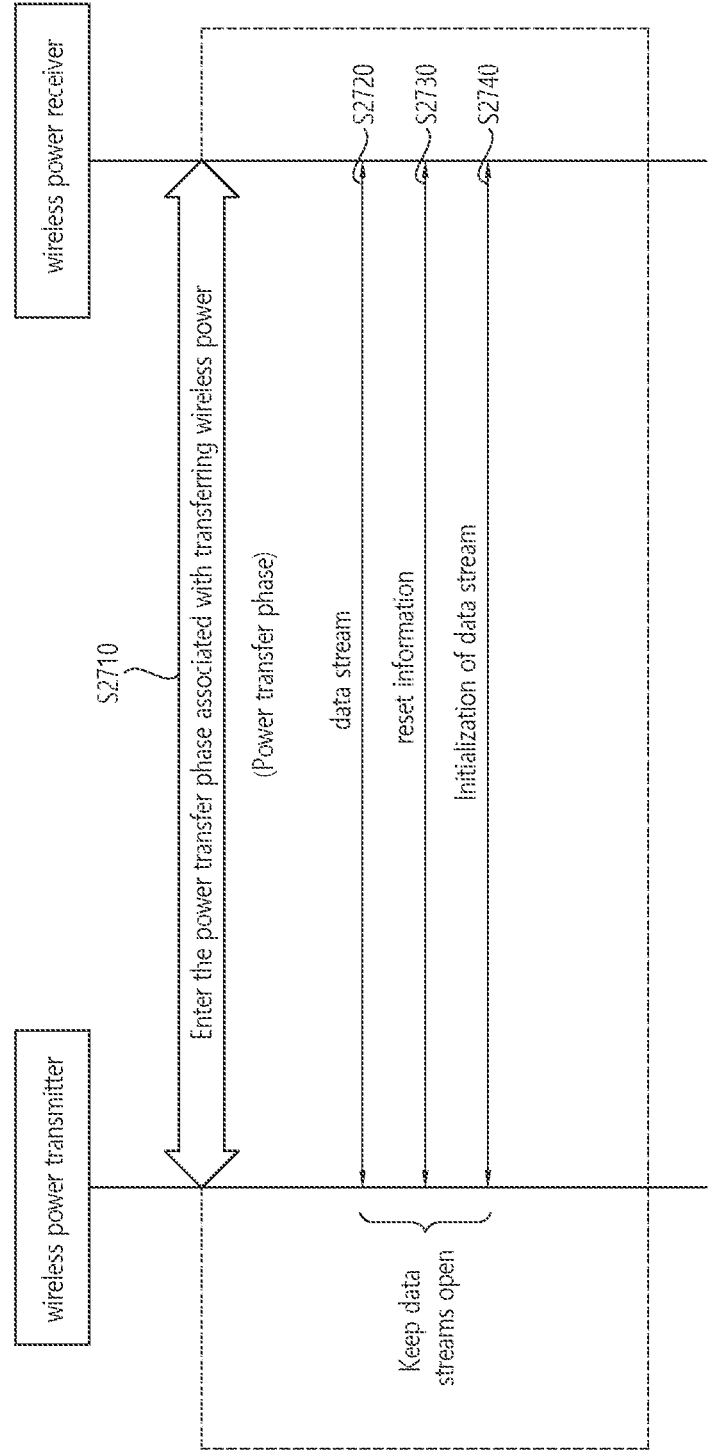
FIG. 27 is a flowchart of a method by which a wireless power transmitter transmits wireless power, according to an embodiment of the present specification.

FIG. 27 is a flowchart of a method by which a wireless power transmitter transmits wireless power, according to an embodiment of the present specification.

According to FIG. 27, the wireless power transmitter may enter a power transfer phase related to transmitting wireless power (S2710).

As explained previously, the wireless power transmitter that has entered the power transfer phase can transmit power to the wireless power receiver. And, power control can be performed by the wireless power receiver periodically transmitting CE packets to the wireless power transmitter. Additionally, the wireless power transmitter may perform FOD during power transfer by receiving RP packets from the wireless power receiver. Since detailed descriptions of these are the same as previously described, repeated descriptions will be omitted.

In addition, the wireless power transmitter and/or wireless power receiver may transmit a data stream to the other party from the standpoint of the data stream initiator.

That is, the wireless power transmitter may transmit a data stream to the wireless power receiver, or the wireless power transmitter may receive a data stream from the wireless power receiver (S2720). At this time, the data stream may include an initial ADC packet, at least one ADT packet, and a final ADC packet. Additionally, the initial ADC packet may correspond to a packet related to the opening of a data stream, and the final ADC packet may correspond to a packet related to the closing of the data stream.

Meanwhile, while the data stream is being transmitted as above, the wireless power transmitter and/or wireless power receiver may transmit reset information to the other party (S2730). That is, the wireless power transmitter can transmit reset information to the wireless power receiver regardless of whether it is the data stream initiator or responder. Additionally, the wireless power receiver can transmit reset information to the wireless power transmitter, regardless of whether it is the data stream initiator or responder.

Afterwards, the wireless power transmitter and/or wireless power receiver may initialize the data stream (S2740).

Here, even though the wireless power transmitter and/or the wireless power receiver initialize each data stream, the openness of the data stream may be maintained. That is, even if the data stream is reset and the data stream is transmitted again, the wireless power transmitter and/or wireless power receiver may immediately transmit the first ADT packet to the other party without transmitting a separate initial ADC to the other party (i.e., without opening a separate data stream).

However, when reset information is transmitted as above, the data stream is not maintained open, and when reset information is transmitted, the data stream is once closed and the data stream is transmitted again from the beginning, the embodiments of the present specification can also be applied (unless mutual combination is impossible).

Hereinafter, this specification will be described in more detail. For convenience of understanding, the following description is based on an example in which a wireless power transmitter transmits a data stream to a wireless power receiver and the wireless power transmitter transmits reset information to the wireless power receiver. However, the example described below is an example to help understand the specification, and the example below also applies to an example in which a wireless power transmitter transmits a data stream to the wireless power transmitter. Additionally, the example below also applies to an example in which the wireless power receiver transmits reset information to the wireless power transmitter.

The following drawings were prepared to explain a specific example of the present specification. Since the names of specific devices or specific signals/messages/fields described in the drawings are provided as examples, the technical features of this specification are not limited to the specific names used in the drawings below.

Figure 28:
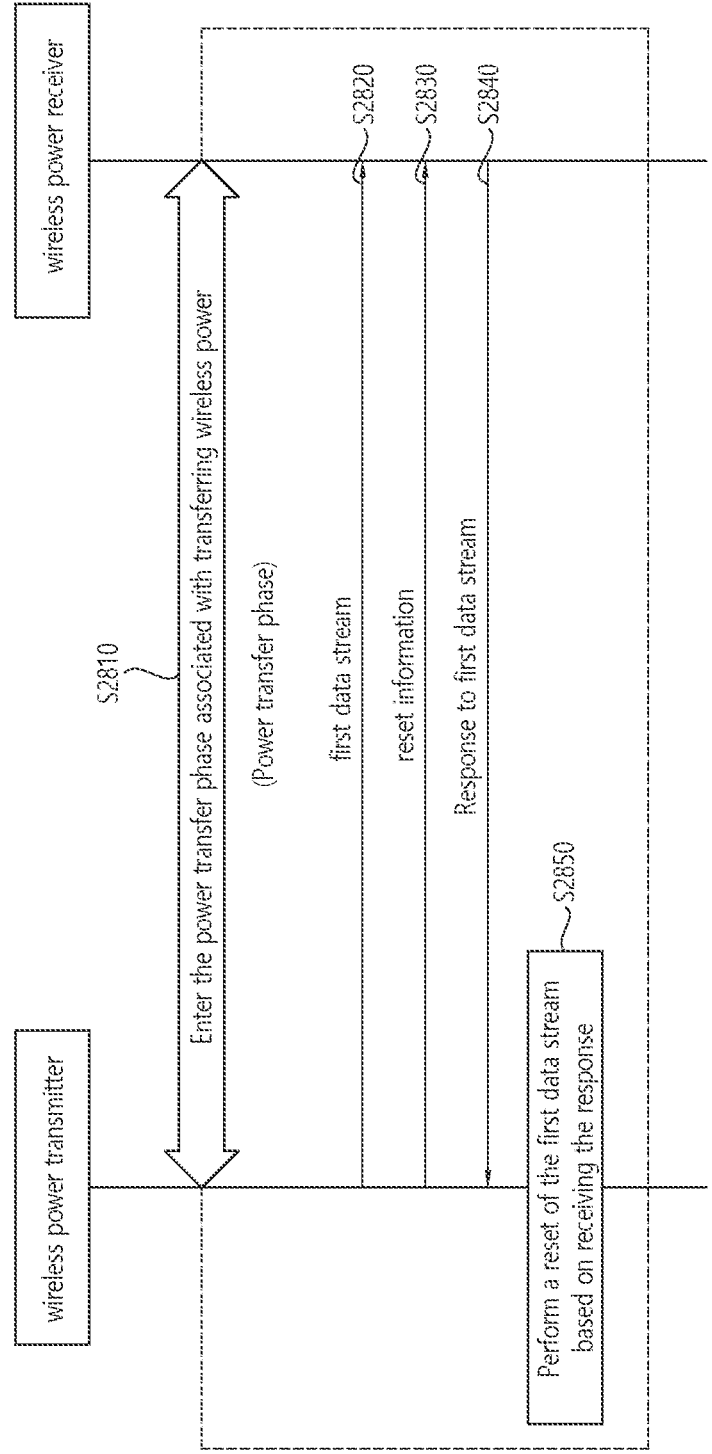
FIG. 28 is a flowchart of a method by which a wireless power transmitter transmits wireless power, according to another embodiment of the present specification.

FIG. 28 is a flowchart of a method by which a wireless power transmitter transmits wireless power, according to another embodiment of the present specification.

According to FIG. 28, the wireless power transmitter may enter a power transfer phase related to transmitting the wireless power (S2810).

Thereafter, the wireless power transmitter may transmit the first data stream to the wireless power receiver during the power transfer phase (S2820). At this time, the first data stream may include an initial ADC (auxiliary data control) packet related to the opening of the first data stream, at least one auxiliary data transport (ADT) packet, or a final ADC packet related to the closing of the first data stream.

The wireless power transmitter may transmit reset information indicating reset of the first data stream to the wireless power receiver (S2830). At this time, the reset information may correspond to a type of ADC packet. Alternatively, the reset information may correspond to a newly defined packet separate from ADC and ADT. Specific examples of reset information will be described later.

The wireless power transmitter may receive a response to the reset information from the wireless power receiver (S2840). At this time, if the wireless power transmitter transmits reset information to the wireless power receiver through a type of ADC packet (or a newly defined packet), the response that the wireless power transmitter receives from the wireless power receiver may correspond to a DSR/ack packet.

On the other hand, unlike this drawing, if the wireless power receiver transmitted reset information to the wireless power transmitter through a type of ADC packet (or a newly defined packet), the response that the wireless power receiver receives from the wireless power transmitter may correspond to an ACK response (e.g., a type of bit pattern).

Thereafter, the wireless power transmitter may reset the first data stream based on receiving the response (S2850).

Here, before and after reset, the first data stream can be maintained open. More specifically, after reset, the wireless power transmitter may transmit the first data stream to the wireless power receiver from the beginning. Here, because the first data stream is maintained open, after reset, the wireless power transmitter can transmit at least one ADT packet to the wireless power receiver without transmitting the initial ADC packet.

Of course, on the contrary, as described above, after reset, the first data stream may be closed, and later, the first data stream may be opened again (i.e., the initial ADC packet is transmitted).

Meanwhile, embodiments of the present specification can also be applied to multi-streams. That is, the wireless power transmitter can be applied even when transmitting a second data stream to the wireless power receiver while transmitting the first data stream. In this case, based on the wireless power transmitter receiving a response to reset information from the wireless power receiver, the wireless power transmitter may perform the reset of the first data stream without resetting the second data stream.

That is, the wireless power transmitter and/or wireless power receiver can reset only the data stream that is the target of reset information. To this end, the reset information may include information identifying the first data stream.

Here, performing a reset may mean that the wireless power transmitter discards data stored in the transport layer or lower based on performing a reset. This can be explained through drawings as follows.

Figure 29:
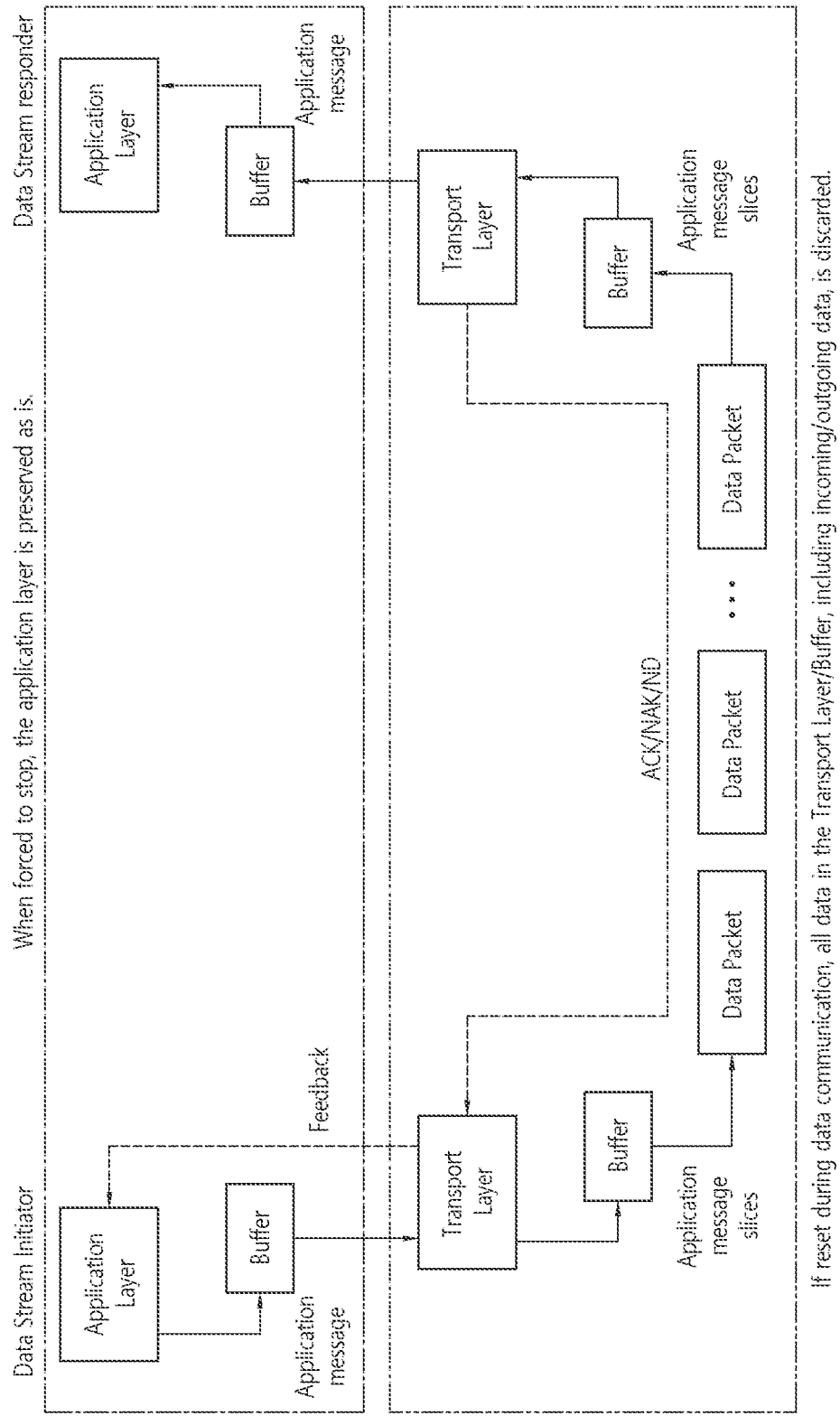
FIG. 29 schematically illustrates the concept of reset of a data stream.

FIG. 29 schematically illustrates the concept of reset of a data stream.

According to FIG. 29, when a reset is performed on the wireless power transmitter and/or wireless power receiver (or data stream initiator and/or data stream responder) during data communication, all data in the transport layer/buffer, including incoming/outgoing data, can be discarded. Here, even in this case, the application layer can be preserved as is.

As an example, during data communication for application data streams #1, #2, and #3, when #2 data stream is reset based on ADC/reset_#2, the wireless power transmitter and/or wireless power receiver may perform a reset by deleting data in the local buffer and/or incoming and outgoing data transmitted and received in the stream corresponding to #2. However, even in this case, the wireless power transmitter and/or wireless power receiver can proceed with data communication with the stream open as is.

(1) Example of Reset Information Structure

Meanwhile, the reset information may be in the form of an ADC packet, and as described above, the reset information may be in the form of a new packet that did not exist before.

Here, if the reset information has the form of, for example, an ADC packet, it may be as described in the drawing below.

FIG. 30 schematically shows an example of reset information.

According to FIG. 30, reset information may be in the form of a type of ADC packet. That is, reset information may include a request field and a parameter field like other ADC packets. And, in addition, the reset information may include an application stream number field.

As an example, each field may be as follows.
Request: 5-ADC/rst
Parameter: Indicates application stream information for which reset is desired.
Application stream number: With the addition of B2, the stream for which reset is desired is indicated separately.

(2) Example Flowchart for Transmission of Reset Information

If specification were to explain the example described above in more detail through a specific flowchart, it could be as follows.

When communicating data between wireless charging devices, there may be cases where the wireless power receiver and/or wireless power transmitter must reset data communication due to unrecoverable communication errors and other communication errors.

In this case, a configuration that enables reset for each application stream is provided, and a reset can be performed for a specific stream through this configuration. At this time, the wireless power receiver and/or the wireless power transmitter may discard all data and/or incoming and outgoing data stored in the local buffer that has been exchanged to date.

In this case, the application stream that performed the reset is initialized, but the stream may remain open. That is, after reset, data communication can be performed again from the beginning.

For example, in the case of a data stream from a wireless power receiver->a wireless power transmitter, after the wireless power transmitter and/or wireless power receiver resets the stream, the data stream from the wireless power receiver to the wireless power transmitter can proceed as is. In other words, the data stream may not end.

First, an example in which a wireless power transmitter transmits reset information to a wireless power receiver will be described.

Figure 31:
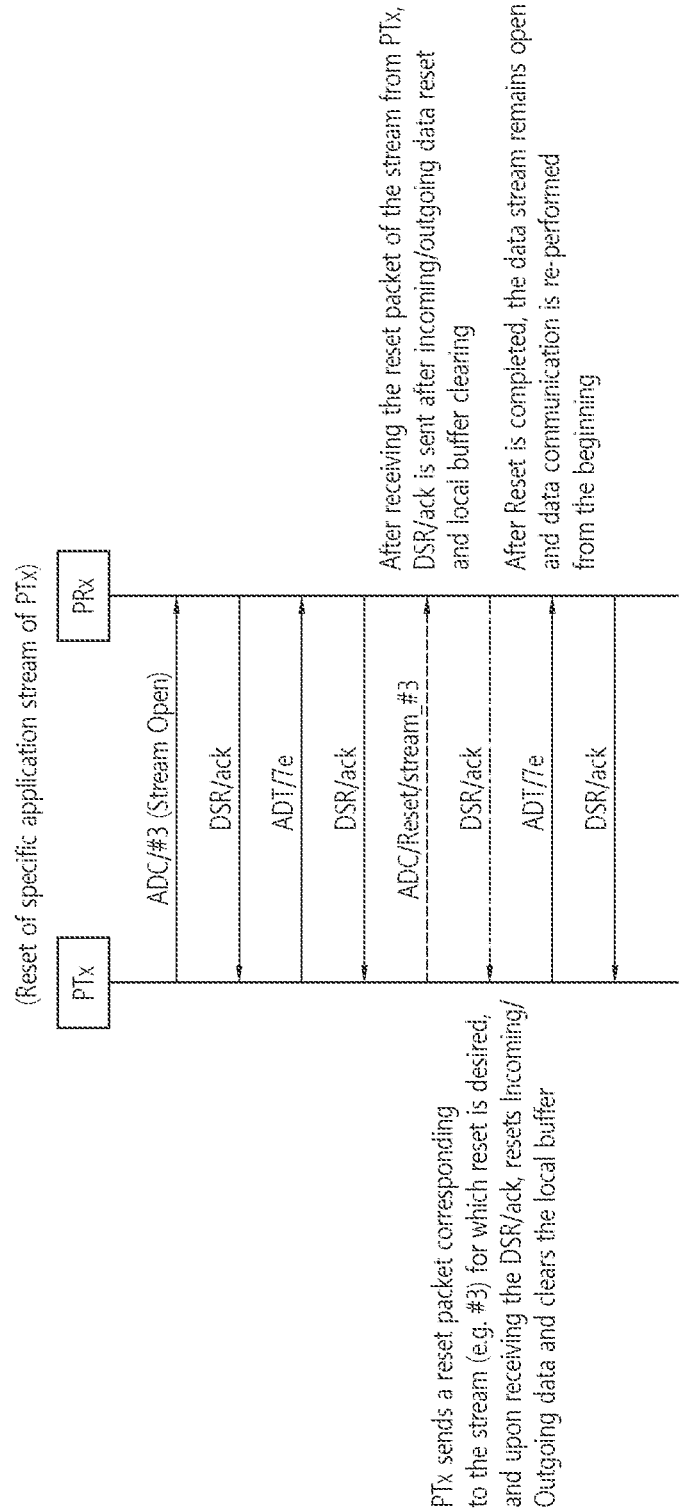
FIG. 31 schematically shows an example in which a wireless power transmitter transmits reset information.

FIG. 31 schematically shows an example in which a wireless power transmitter transmits reset information.

According to FIG. 31, while the wireless power transmitter is transmitting a data stream to the wireless power receiver, reset information (e.g., an ADC packet indicating resetting stream #3, i.e., ADC/reset/steram #3) may be transmitted to the wireless power receiver. Here, the example of FIG. 31 shows an example where the wireless power transmitter transmits a data stream to the wireless power receiver, but the example of FIG. 31 can also be applied when the wireless power receiver transmits a data stream to the wireless power transmitter.

When the wireless power transmitter transmits reset information to the wireless power receiver, after the wireless power receiver receives the reset packet of the corresponding stream from the wireless power transmitter, reset of incoming and/or outgoing data and clear of local buffer may be performed. Afterwards, the wireless power receiver may send a DSR/ack to the wireless power transmitter.

The wireless power transmitter sends a reset packet corresponding to the stream for which reset is desired (e.g. #3) as described above, the wireless power transmitter may perform a reset of incoming and/or outgoing data and clear a local buffer at the same time as receiving the DSR/ack from the wireless power receiver.

The example of FIG. 31 is explained differently as follows. The wireless power transmitter indicates to the wireless power receiver a reset intention for a specific application stream, the moment the wireless power transmitter receives a DSR/ack from the other party, the wireless power transmitter can perform a reset function.

The wireless power receiver can perform a reset function when it receives a reset intention indication from the wireless power transmitter. The wireless power receiver that has completed the reset function can send a DSR/ack to the wireless power transmitter upon completion.

Based on the response of the wireless power receiver, the wireless power receiver and/or the wireless power transmitter discards the data stored in the local buffer and/or the incoming and outgoing data that have been exchanged to date.

However, in this case, the wireless power transmitter and/or wireless power receiver may preserve application layer data. However, the wireless power transmitter and/or the wireless power receiver may discard all data and/or incoming and outgoing data stored in the transport layer and the local buffer exchanged to date.

Even when both the wireless power transmitter and/or the wireless power receiver complete reset, the corresponding application stream may remain open. And, the wireless power transmitter can continue to perform data communication for the corresponding application stream on which reset was performed.

That is, if the initiator is a wireless power transmitter and the responder is a wireless power receiver before reset, the wireless power transmitter can be the initiator and the wireless power receiver can be the responder even after reset. Conversely, if the initiator is a wireless power receiver and the responder is a wireless power transmitter before reset, the wireless power receiver can be the initiator and the wireless power transmitter can be the responder even after reset.

Hereinafter, an example in which a wireless power receiver transmits reset information to a wireless power transmitter will be described.

Figure 32:
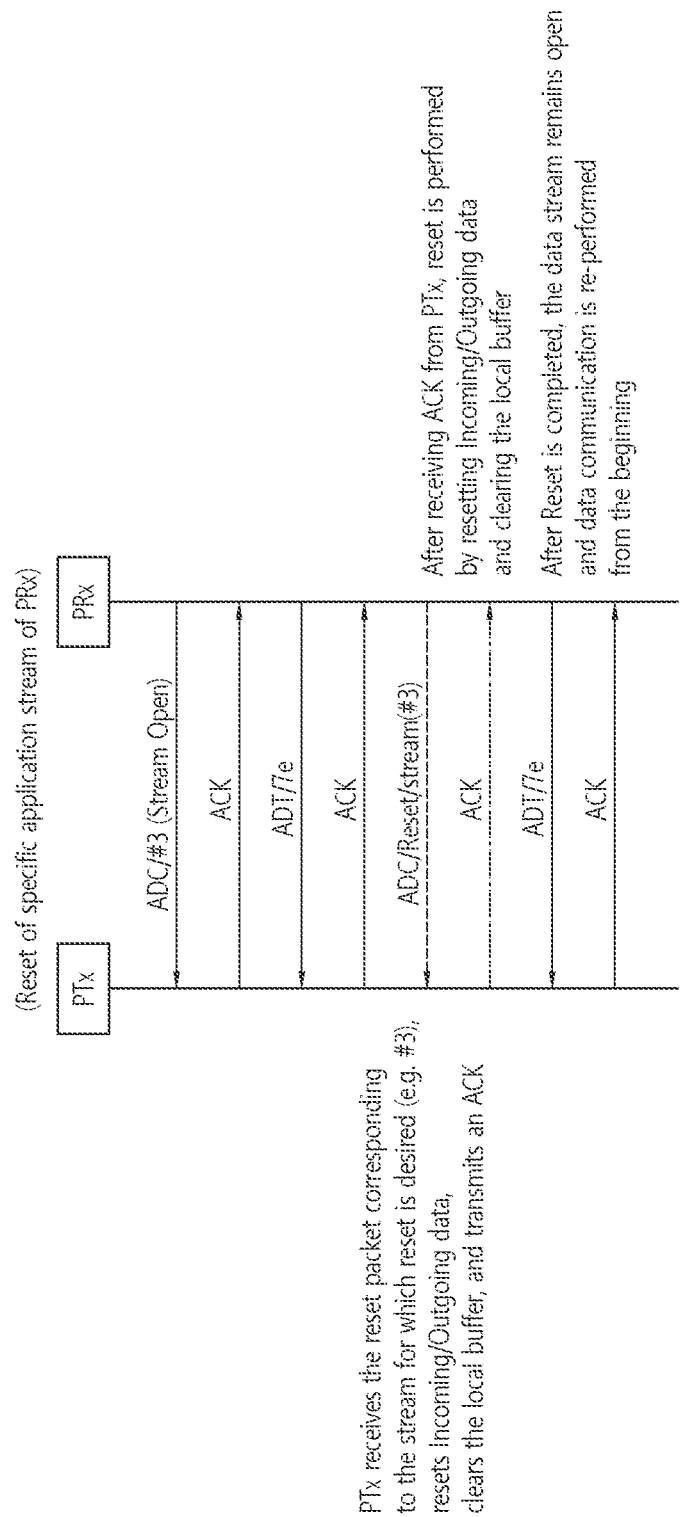
FIG. 32 schematically shows an example in which a wireless power receiver transmits reset information.

FIG. 32 schematically shows an example in which a wireless power receiver transmits reset information.

According to FIG. 32, while the wireless power receiver is transmitting a data stream to the wireless power transmitter, reset information (e.g., an ADC packet indicating resetting stream #3, i.e., ADC/reset/steram #3) may be transmitted to the wireless power transmitter. Here, the example of FIG. 32 shows an example in which the wireless power receiver transmits a data stream to the wireless power transmitter, but the example of FIG. 32 can also be applied when the wireless power transmitter transmits a data stream to the wireless power receiver.

The wireless power transmitter may receive a reset packet corresponding to the stream for which reset is desired (e.g. #3) and simultaneously perform reset of incoming and/or outgoing data and clear of the local buffer. And, the wireless power transmitter can transmit ACK to the wireless power receiver.

After receiving an ACK from the wireless power transmitter, the wireless power receiver may perform a reset by resetting the incoming and/or outgoing data and clearing the local buffer.

Thereafter, the wireless power transmitter and/or wireless power receiver may re-perform data communication from the beginning while maintaining the open state of the data stream after completion of reset.

The example of FIG. 32 is explained differently as follows. The moment the wireless power receiver indicates to the wireless power transmitter an intention to reset a specific application stream and receives an ACK from the other wireless power receiver, the wireless power receiver can perform a reset function.

The wireless power receiver can perform a reset function when it receives a reset intention indication from the wireless power transmitter. The wireless power transmitter that has completed the reset function may send an ACK to the wireless power receiver upon completion.

Based on the response of the wireless power transmitter, the wireless power transmitter and/or the wireless power receiver discards the data stored in the local buffer and/or the incoming and outgoing data that have been exchanged to date.

However, in this case, the wireless power receiver and/or wireless power transmitter may preserve application layer data. However, the wireless power receiver and/or the wireless power transmitter may discard all data and/or incoming and outgoing data stored in the transport layer and the local buffer that has been exchanged to date.

Even when both the wireless power receiver and/or the wireless power transmitter complete reset, the corresponding application stream may remain open. And, the wireless power receiver can continue to perform data communication for the corresponding application stream on which reset was performed.

That is, if the initiator is a wireless power receiver and the responder is a wireless power transmitter before reset, the wireless power receiver can be the initiator and the wireless power transmitter can be the responder even after reset. Conversely, if the initiator is a wireless power transmitter and the responder is a wireless power receiver before reset, the wireless power transmitter can be the initiator and the wireless power receiver can be the responder even after reset.

Hereinafter, a method for transmitting reset information will be described in different forms using drawings.

Figure 33:
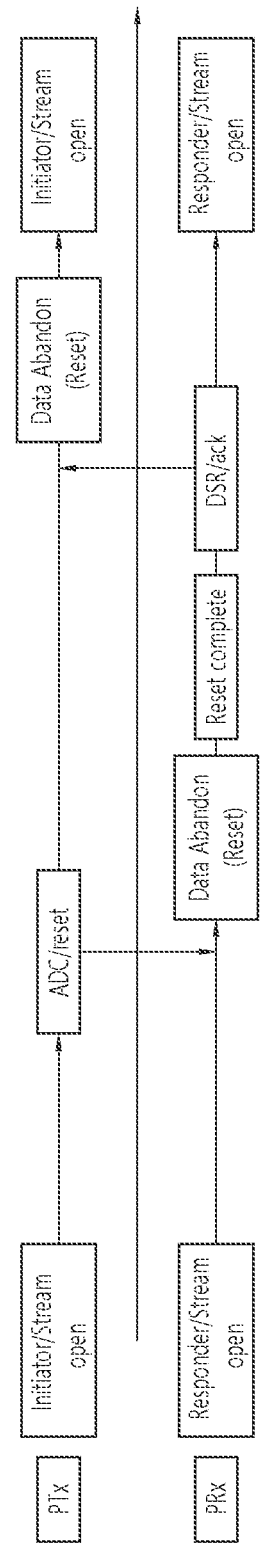
FIG. 33 shows an example of a method for transmitting reset information in another form.

FIG. 33 shows an example of a method for transmitting reset information in another form.

According to FIG. 33, until the data stream is closed, regardless of who sends information about reset (i.e., regardless of whether the subject of transmission is a wireless power receiver, wireless power transmitter, initiator, or responder), the data stream can proceed while maintaining the status of the initiator and responder.

A problem may occur while the wireless power transmitter and/or wireless power receiver is performing data communication while the data stream is open, and the wireless power transmitter may send an ADC/reset. In this case, the wireless power receiver can receive reset information and perform a reset function. After completion of the reset function, the wireless power receiver can issue a DSR/ack to the wireless power transmitter. When the wireless power transmitter receives DSR/ack as a response from the wireless power receiver, the wireless power transmitter may perform a reset function. This is because if the wireless power transmitter performs a reset before receiving a response from the wireless power receiver, it is difficult for the wireless power transmitter to interpret the response received from the wireless power receiver.

If both devices, the wireless power receiver and/or the wireless power transmitter, perform a reset, the stream before the reset is maintained as is. And, with the stream open, the wireless power transmitter and/or wireless power receiver can perform data communication again.

Meanwhile, as described above, even though the wireless power transmitter or wireless power receiver transmits reset information to the other party, the wireless power transmitter or wireless power receiver may not receive a response from the other party. In such cases, a problem may arise in which data communication must continue despite a problem occurring in the wireless power system.

Accordingly, as described above, in this specification, a method of forcibly terminating (in other words, aborting) a data stream will be described.

Here, the conditions for entering forced termination may be separate from the conditions for the previous reset. That is, the wireless power transmitter and/or wireless power receiver can immediately perform a forced termination without resetting the data stream when a previous problem situation occurs.

On the other hand, the wireless power transmitter and/or wireless power receiver first attempts a reset as described above, and if the wireless power transmitter and/or wireless power receiver does not receive a response to the reset information from the other party (or, if a response is not received for a certain period of time; or, if a response to reset information is not received even though reset information has been repeatedly transmitted a certain number of times), it may proceed with the protocol of forced termination.

Hereinafter, examples of forced termination will be described in more detail.

2. Abort of Data Stream

The following drawings were prepared to explain a specific example of the present specification. Since the names of specific devices or specific signals/messages/fields described in the drawings are provided as examples, the technical features of this specification are not limited to the specific names used in the drawings below.

Figure 34:
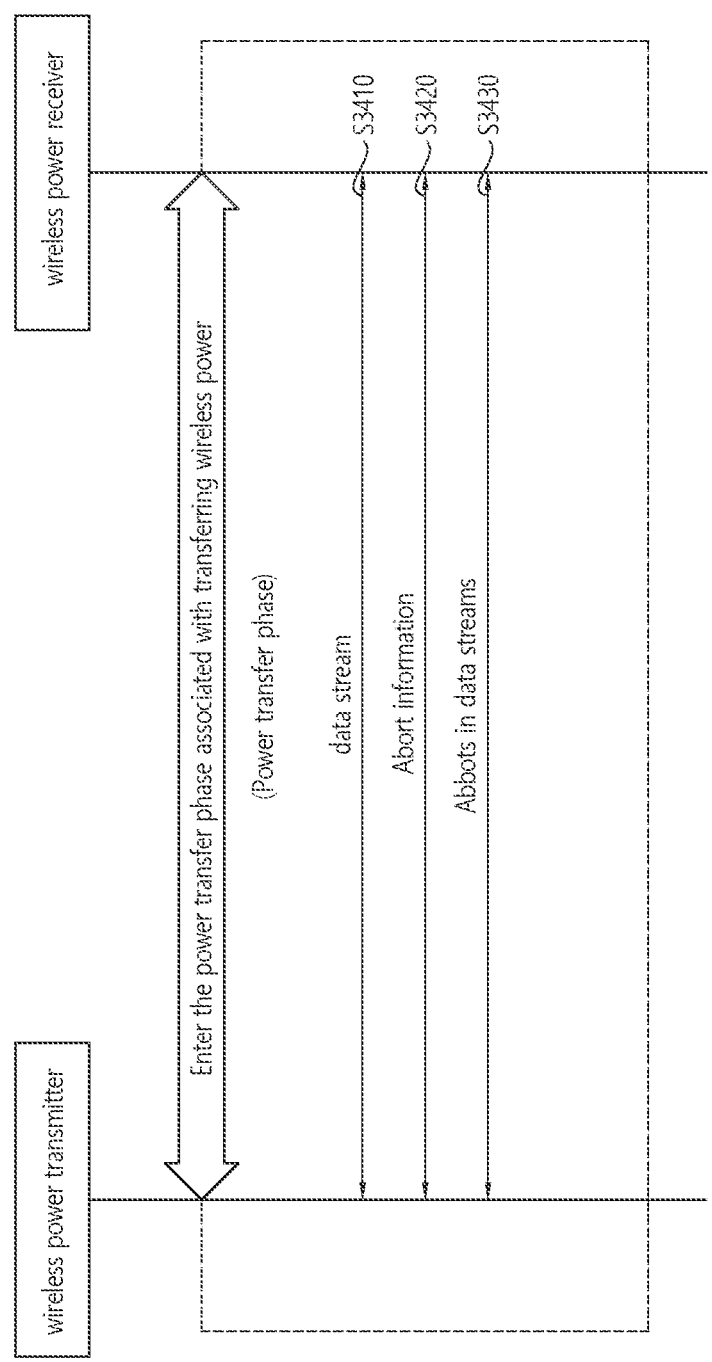
FIG. 34 is a flowchart of a method by which a wireless power transmitter transmits wireless power, according to another embodiment of the present specification.

FIG. 34 is a flowchart of a method by which a wireless power transmitter transmits wireless power, according to another embodiment of the present specification.

According to FIG. 34, the wireless power transmitter may enter a power transfer phase related to transmitting wireless power (S3410).

As explained previously, the wireless power transmitter that has entered the power transfer phase can transmit power to the wireless power receiver. And, power control can be performed by the wireless power receiver periodically transmitting CE packets to the wireless power transmitter. Additionally, the wireless power transmitter may perform FOD during power transfer by receiving RP packets from the wireless power receiver. Since detailed descriptions of these are the same as previously described, repeated descriptions will be omitted.

In addition, the wireless power transmitter and/or wireless power receiver may transmit a data stream to the other party from the standpoint of the data stream initiator.

That is, the wireless power transmitter may transmit a data stream to the wireless power receiver, or the wireless power transmitter may receive a data stream from the wireless power receiver (S3420). At this time, the data stream may include an initial ADC packet, at least one ADT packet, and a final ADC packet. Additionally, the initial ADC packet may correspond to a packet related to the opening of a data stream, and the final ADC packet may correspond to a packet related to the closing of the data stream.

Meanwhile, while the data stream is being transmitted as above, the wireless power transmitter and/or the wireless power receiver may transmit abort information to the other party (S3430). That is, the wireless power transmitter can transmit abort information to the wireless power receiver regardless of whether it is the data stream initiator or the responder. In addition, the wireless power receiver can transmit abort information to the wireless power transmitter regardless of whether it is the data stream initiator or responder.

Thereafter, the wireless power transmitter and/or the wireless power receiver may perform abort (i.e., forced termination) of the data stream (S3440).

Here, the wireless power transmitter may perform abort of the first data stream based on transmitting abort information. On the other hand, the wireless power transmitter may perform an abort on the first data stream based on receiving a response to the abort information.

After the abort, the wireless power transmitter may close the first data stream.

Figure 35:
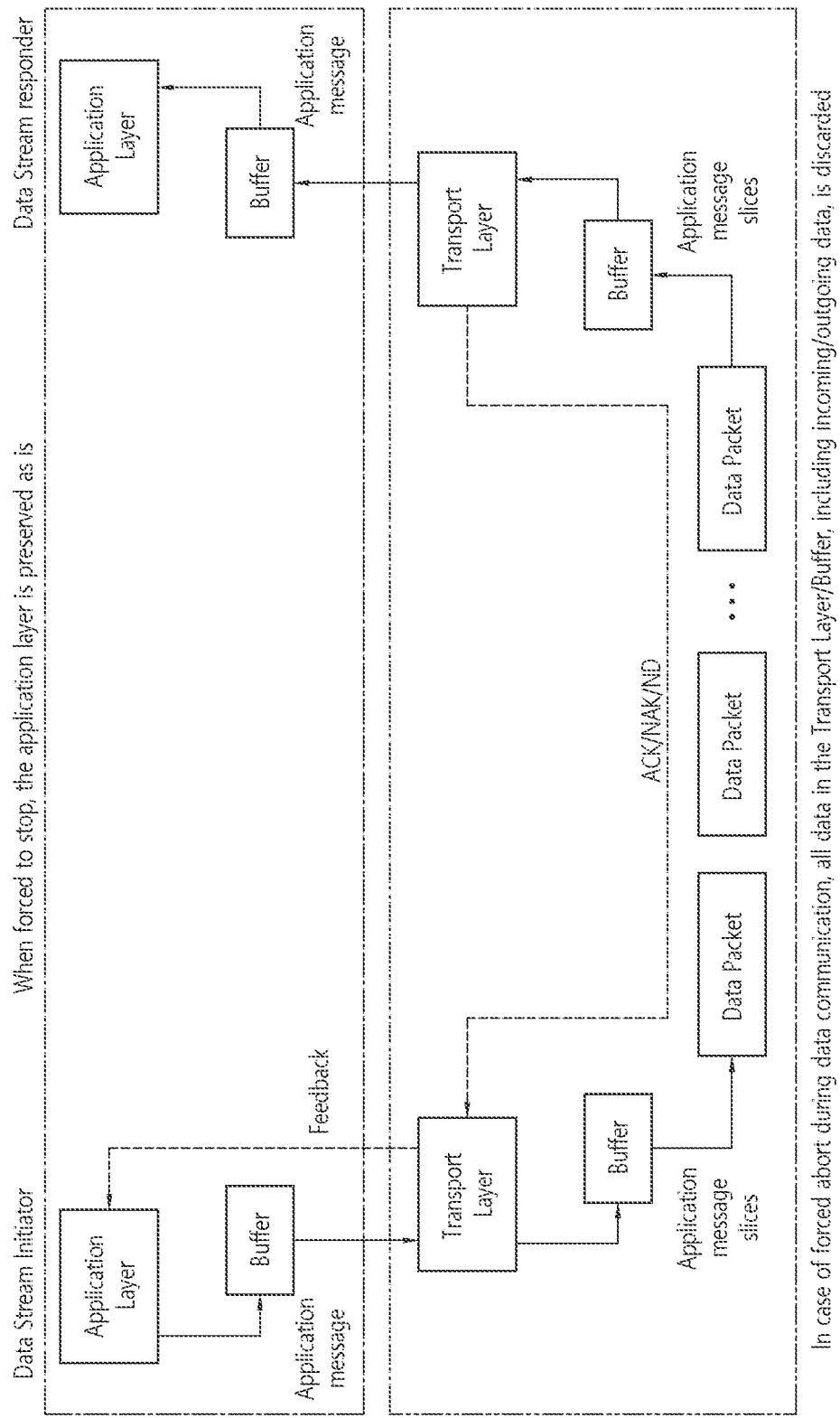
FIG. 35 schematically illustrates the concept of abort of a data stream.

Here, the wireless power transmitter may discard data stored below the transport layer based on performing an abort. This can be explained through drawings as follows. FIG. 35 schematically illustrates the concept of abort of a data stream.

According to FIG. 35, when an abort is performed during data communication, the wireless power transmitter and/or wireless power receiver (or data stream initiator and/or data stream responder) may discard all data in the transport layer/buffer, including incoming/outgoing data. Here, even in this case, the application layer can be preserved as is.

As an example, in the case of an abort during data communication of a specific application stream, any receiver/transmitter can send abort information regardless of the initiator/responder of the data.

(1) Example of the Structure of Abort Information

Meanwhile, the abort information may be in the form of a packet for a separate data communication (TPL), and the abort information may be a modified form of an existing packet as described above. In other words, the method by which the wireless power receiver/wireless power transmitter communicates abort to the other device may be in the form of a separate TPL packet being provided or a bit being added to an existing packet (DSR/ADC/other packet).

Here, if the abort information is, for example, in the form of a packet for separate data communication, it may be as described in the drawing below.

FIG. 36 schematically shows an example of abort information.

According to FIG. 36, as an example of abort information, a separate packet used in data communication may be defined.

The information at this time may include a field (information) about the type of TPL. As examples, the following values can be provided.

0×00-TPL/Pause
0×01-TPL/Busy
0×02-TPL/Abort
0×03-0xFF-TPL/Reserved

Meanwhile, if the abort information has the form of, for example, an existing packet for data communication, it may be as described in the drawing below. In the example below, an example in which a DSR packet is used for abort information is described and shown.

FIG. 37 schematically shows another example of abort information.

According to FIG. 37, as an example of abort information, a DSR packet used in data communication can be used. For example, a separate field called TPL/type may be defined in the DSR packet.

The information at this time may include a field (information) about the type of TPL. As examples, the following values can be provided.

0×00-TPL/Pause
0×01-TPL/Busy
0×02-TPL/Abort
0×03~0xFF-TPL/

(2) Flowchart of an Example of Transmission of Abort Information

If the example described above in the specification is explained in more detail through a specific flow chart, it may be as follows.

During data communication between wireless charging devices, there may be times when the data communication currently in progress cannot proceed any further. As an example of this, when charging is no longer possible due to a specific abnormal condition, or when charging is temporarily interrupted, or when charging is difficult to operate normally, or charging is unstable, or when an error occurs during data communication etc. may exist.

In the above case, the wireless power transmitter and/or the wireless power receiver may signal an intention to abort to the other device and terminate data communication.

Here, when data communication is terminated, the wireless power transmitter and/or the wireless power receiver may discard all data and/or incoming and outgoing data stored in the local buffer that has been exchanged to date. However, even in this case, the wireless power transmitter and/or wireless power receiver may preserve data in the buffer of the application layer.

First, an example in which a wireless power transmitter transmits abort information to a wireless power receiver will be described.

Figure 38:
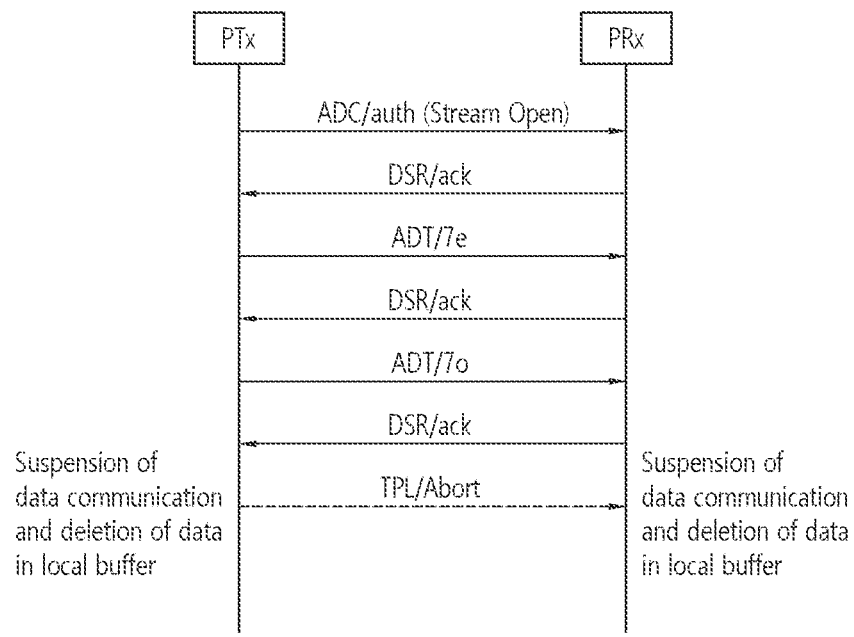
FIGS. 38 and 39 are flowcharts of an example of a wireless power transmitter transmitting abort information to a wireless power receiver.
Figure 39:
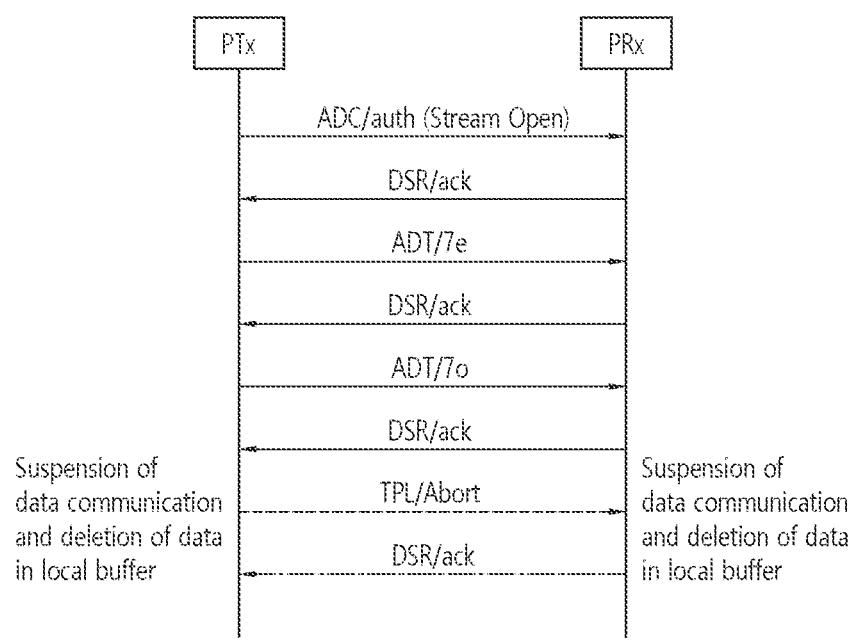

FIGS. 38 and 39 are flowcharts of an example of a wireless power transmitter transmitting abort information to a wireless power receiver.

According to FIGS. 38 and 39, data communication may be forcibly terminated at the moment the wireless power transmitter signals forced termination to the wireless power receiver or the moment it signals forced termination and receives a DSR/ack from the other party. In this case, the wireless power transmitter and/or wireless power receiver may discard all data sent and received to date, data stored in a local buffer, and/or incoming and outgoing data.

However, the wireless power transmitter and/or wireless power receiver may preserve application layer data. Additionally, the wireless power transmitter and/or wireless power receiver may discard all data in the transport layer, local buffer, and incoming and outgoing data.

A method for the wireless power receiver and/or wireless power transmitter to indicate forced shutdown to the other device may include a separate Pause packet or a method of adding a bit to an existing packet (DSR/ADC/other packet). The details of this are the same as described previously.

Here, the differences between FIGS. 38 and 39 are as follows. In FIG. 38, the data stream may be forcibly terminated the moment the wireless power transmitter indicates its intention to force data termination to the other party. In FIG. 39, when the wireless power transmitter signals its intention to force data termination to the other party and the wireless power transmitter receives a DSR/ack from the wireless power receiver, the data stream may be forcibly terminated.

Hereinafter, an example in which a wireless power receiver transmits abort information to a wireless power transmitter will be described.

Figure 40:
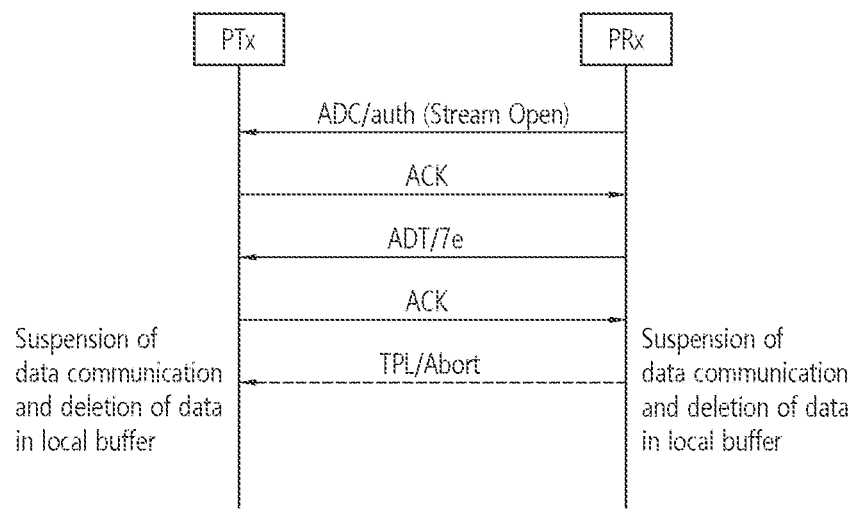
FIGS. 40 and 41 are flowcharts of an example of a wireless power transmitter transmitting abort information to a wireless power receiver.
Figure 41:
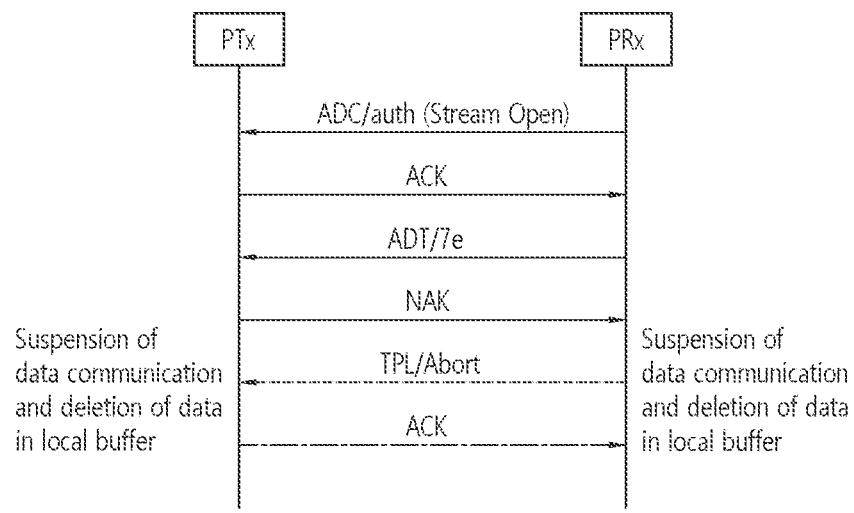

FIGS. 40 and 41 are flowcharts of an example of a wireless power transmitter transmitting abort information to a wireless power receiver.

According to FIGS. 40 and 41, the moment the wireless power receiver indicates to the wireless power transmitter its intention to force termination or the moment it indicates its intention to force termination and receives an ACK from the other party, data communication may be forcibly terminated. The wireless power transmitter and/or wireless power receiver may discard all data sent and received to date, data stored in a local buffer, and/or incoming and outgoing data. However, even in this case, the wireless power transmitter and/or wireless power receiver can preserve application layer data. On the other hand, the wireless power transmitter and/or wireless power receiver may discard all data in the transport layer, local buffer, and incoming and outgoing data.

Here, a method for the wireless power receiver and/or wireless power transmitter to indicate forced termination to the other device may include a separate abort packet or a method of adding a bit to an existing packet (DSR/ADC/other packet). A specific example of this is as described above.

Here, the differences between FIGS. 40 and 41 are as follows. In FIG. 40, the data stream may be forcibly terminated the moment the wireless power receiver indicates to the other party its intention to forcibly terminate the data. In FIG. 41, when the wireless power receiver signals its intention to force data termination to the other party and the wireless power receiver receives an ACK from the wireless power transmitter, the data stream may be force terminated.

Figure 42:
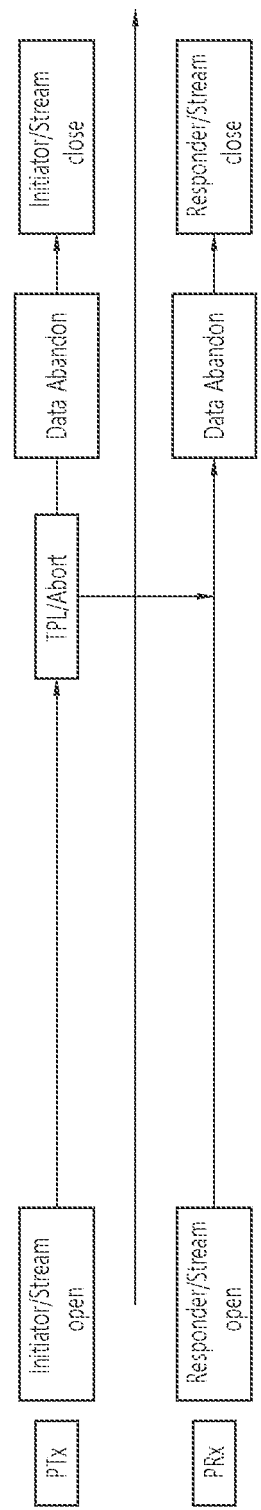
FIG. 42 shows an example of a method for transmitting abort information in another form.

FIG. 42 shows an example of a method for transmitting abort information in another form.

According to FIG. 42, when an abort occurs during data communication of a specific application stream, abort information can be sent to the other party regardless of who the initiator and/or responder of the data exchange is (and who the wireless power transmitter and/or wireless power receiver are).

In the example of FIG. 42, the wireless power transmitter may transmit abort information from the initiator's perspective to the wireless power receiver. And, based on the transmission of the above abort information, the data stream between the wireless power transmitter and the wireless power receiver may be forcibly terminated.

3. Combination of Reset and Forced Termination of Data Stream

So far, embodiments of the present specification have been described once from the perspective of resetting a data stream and once from the perspective of forced termination of the data stream.

Here, the above embodiments may operate separately as described above, and at the same time, the previous embodiments may operate in combination.

In addition, the examples described above can be applied even when the wireless power transmitter and/or wireless power receiver supports multi-stream.

An example in which the previous examples are combined may be described with reference to the drawings as follows.

Figure 43:
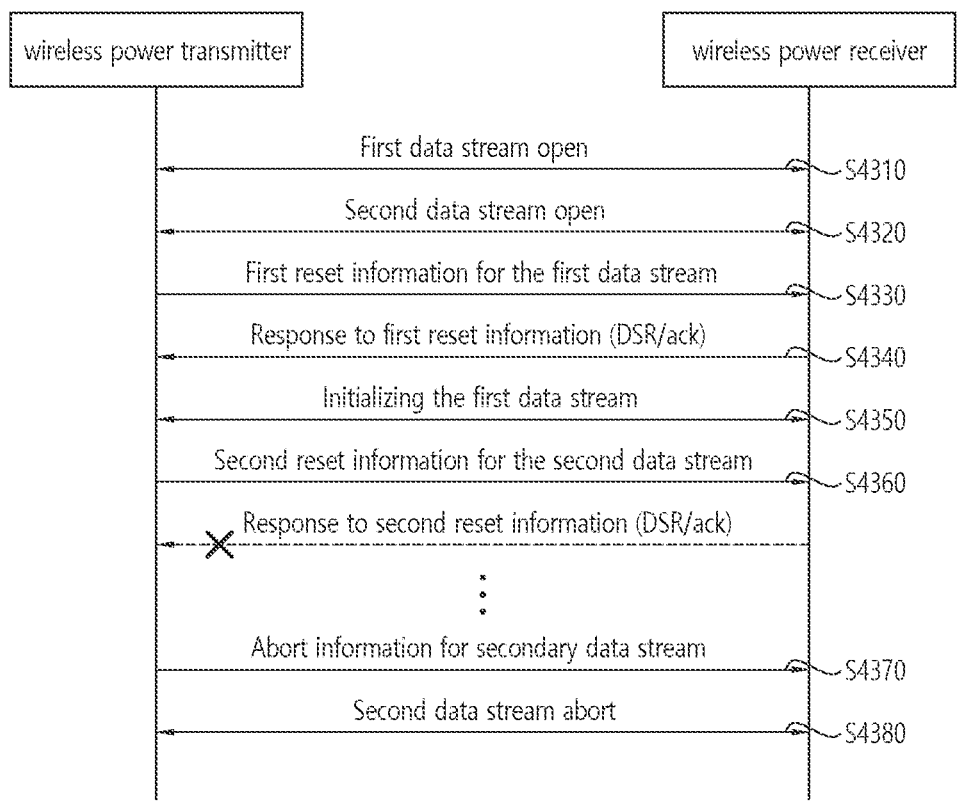
FIG. 43 is a flowchart of a method by which a wireless power transmitter transmits wireless power, according to another embodiment of the present specification.

FIG. 43 is a flowchart of a method by which a wireless power transmitter transmits wireless power, according to another embodiment of the present specification.

According to FIG. 43, the wireless power transmitter and/or the wireless power receiver may open the first data stream (S4310). That is, the wireless power transmitter may transmit an initial ADC packet for the first data stream (that is, the channel of the first data stream is marked) to the wireless power receiver. Alternatively, the wireless power receiver may transmit an initial ADC packet for the first data stream (that is, the channel of the first data stream is marked) to the wireless power transmitter.

Meanwhile, as described above, this specification can support the opening of multi-streams. That is, in this specification, while the wireless power transmitter and the wireless power receiver are exchanging the first data stream, they may also exchange the second data stream.

In other words, the wireless power transmitter and/or wireless power receiver may open the second data stream (S4320). That is, the wireless power transmitter may transmit an initial ADC packet for the second data stream (that is, the channel of the second data stream is marked) to the wireless power receiver. Alternatively, the wireless power receiver may transmit an initial ADC packet for the second data stream (that is, the channel of the second data stream is marked) to the wireless power transmitter.

i) In summary, according to the present specification, exchange of multi-streams between a wireless power transmitter and a wireless power receiver can be provided.

Meanwhile, for example, the wireless power transmitter may transmit first reset information for the first data stream to the wireless power receiver (S4330). At this time, the first reset information may be in the form of a type of ADC packet, as described above, or may be in the form of a separate data packet. Additionally, the first reset information may be marked as information about the first data stream.

The wireless power transmitter may receive a response to the first reset information from the wireless power receiver (S4340). Here, since the wireless power transmitter receives a response from the wireless power receiver, the response at this time may be, for example, DSR/ack. If the wireless power receiver receives a response from the wireless power transmitter, the response at this time may be ACK.

Afterwards, the wireless power transmitter and/or wireless power receiver may initialize the first data stream (S4350).

However, since the wireless reset corresponds to a reset for the first data stream, the wireless power transmitter and/or the wireless power receiver can transmit or receive the second data stream. That is, the second data stream may not be initialized.

ii) In summary, according to the present specification, reset for a specific data stream may be provided.

However, even if reset for a specific data stream is provided, this specification does not intend to exclude from the scope of rights the reset for all open data streams. Accordingly, an example of performing a reset on all data streams and an example of performing an abort (on a specific stream or all streams) may be combined.

Meanwhile, the wireless power transmitter may transmit second reset information for the second data stream to the wireless power receiver (S4360).

Here, the wireless power transmitter may not receive a response to the second data stream from the wireless power receiver.

If a specific condition is satisfied, the wireless power transmitter may transmit abort information about the second data stream to the wireless power receiver (S4370).

The condition at this time may include a case where a response to the second reset information is not received for a specific period (it can be exchanged between the wireless power transmitter and wireless power receiver in advance, or can be defined in advance) of time after the wireless power transmitter transmits the second reset information.

Alternatively, the condition at this time may include a case where a response to the second reset information is not received until the wireless power transmitter repeatedly transmits the second reset information a preset number of times (it can be exchanged between the wireless power transmitter and wireless power receiver in advance, or can be defined in advance).

Afterwards, the wireless power transmitter and wireless power receiver may abort the second data stream (S4380).

iii) In summary, according to this specification, an abort for a specific data stream can be provided.

However, even if an abort is provided for a specific data stream, this specification does not intend to exclude from the scope of rights abort on all open data streams. Accordingly, an example of performing an abort on all data streams and an example of performing a reset (for a specific stream or all streams) may be combined.

iv) In summary, according to this specification, transmission of reset information and transmission of abort information can be combined.

Of course, as described above, the example in which reset information is transmitted and the example in which abort information is transmitted may operate separately.

Hereinafter, embodiments of the present specification will be described again from the viewpoint of various subjects.

The following drawings were prepared to explain a specific example of the present specification. Since the names of specific devices or specific signals/messages/fields described in the drawings are provided as examples, the technical features of this specification are not limited to the specific names used in the drawings below.

Figure 44:
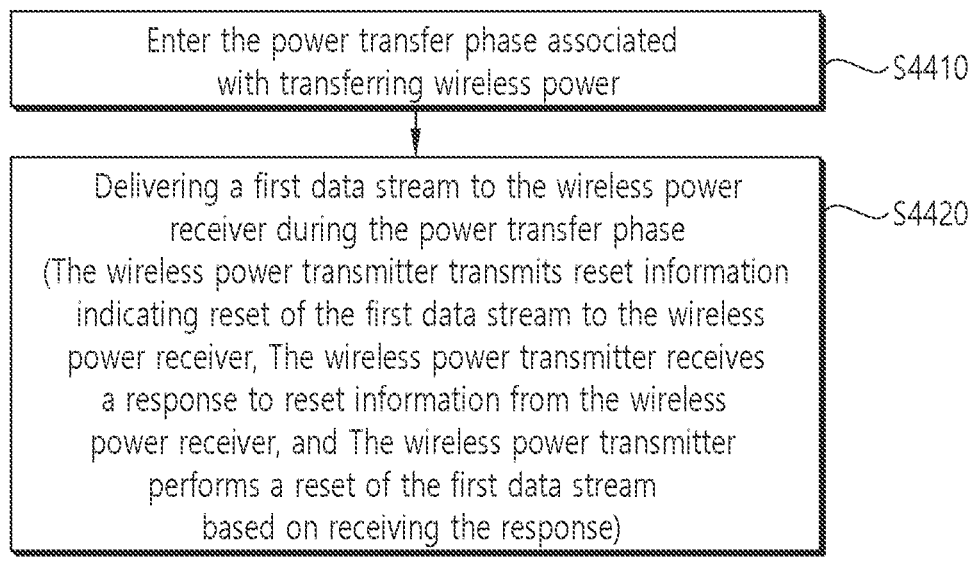
FIG. 44 is a flowchart of a method for transmitting wireless power from the perspective of a wireless power transmitter, according to an embodiment of the present specification.

FIG. 44 is a flowchart of a method for transmitting wireless power from the perspective of a wireless power transmitter, according to an embodiment of the present specification.

According to FIG. 44, the wireless power transmitter may enter a power transfer phase related to transmitting the wireless power (S4410).

The wireless power transmitter may transmit a first data stream to the wireless power receiver during the power transfer phase (S4420).

Here, the wireless power transmitter transmits reset information indicating reset of the first data stream to the wireless power receiver, the wireless power transmitter receives a response to the reset information from the wireless power receiver, and the wireless power transmitter may reset the first data stream based on receiving the response.

Here, before and after the reset, the first data stream can be maintained open. And, after the reset, the wireless power transmitter can transmit the first data stream to the wireless power receiver from the beginning. And, the first data stream includes an initial auxiliary data control (ADC) packet related to the opening of the first data stream, at least one auxiliary data transport (ADT) packet, or a final ADC packet related to the closing of the first data stream, after the reset, the wireless power transmitter may transmit the at least one ADT packet to the wireless power receiver without transmitting the initial ADC packet.

Here, the wireless power transmitter may transmit a second data stream to the wireless power receiver while transmitting the first data stream. And, based on the wireless power transmitter receiving the response to the reset information from the wireless power receiver, the wireless power transmitter may perform the reset of the first data stream without resetting the second data stream.

Here, the reset information may include information identifying the first data stream.

Here, the wireless power transmitter may discard data stored below the transport layer based on performing the reset.

Here, the wireless power transmitter may transmit abort information indicating abort of the first data stream to the wireless power receiver based on not receiving the response. And, the wireless power transmitter may perform the abort of the first data stream based on transmitting the abort information. Alternatively, after the abort, the wireless power transmitter may close the first data stream. And, the wireless power transmitter may perform the abort of the first data stream based on receiving a response to the abort information. Additionally, the wireless power transmitter may discard data stored below the transport layer based on performing the abort.

Although not separately shown, a wireless power transmitter may be provided. The wireless power transmitter may include a converter involved in transferring wireless power to a wireless power receiver, and a communication/controller involved in controlling the transfer of the wireless power. The wireless power transmitter may enter a power transfer phase associated with transferring the wireless power and transfer a first data stream to the wireless power receiver during the power transfer phase. The wireless power transmitter transmits reset information indicating reset of the first data stream to the wireless power receiver, the wireless power transmitter receives a response to the reset information from the wireless power receiver, and the wireless power transmitter may reset the first data stream based on receiving the response.

Figure 45:
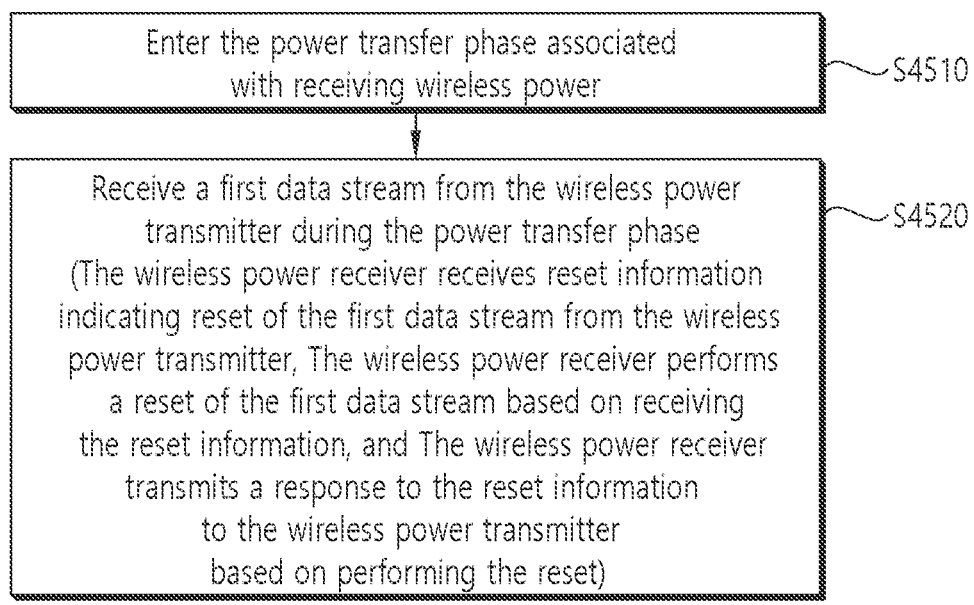
FIG. 45 is a flowchart of a method of receiving wireless power from the perspective of a wireless power receiver, according to an embodiment of the present specification.

FIG. 45 is a flowchart of a method of receiving wireless power from the perspective of a wireless power receiver, according to an embodiment of the present specification.

According to FIG. 45, the wireless power receiver may enter a power transfer phase related to receiving the wireless power (S4510).

The wireless power receiver may receive a first data stream from the wireless power transmitter during the power transfer phase (S4520).

Here, the wireless power receiver receives reset information indicating reset of the first data stream from the wireless power transmitter, the wireless power receiver performs a reset of the first data stream based on receiving the reset information, and the wireless power receiver may transmit a response to the reset information to the wireless power transmitter based on performing the reset.

Although not separately shown, a wireless power receiver may be provided. The wireless power receiver may include a power pickup device related to receiving wireless power from a wireless power transmitter and a communication/controller device related to controlling the reception of the wireless power. The wireless power receiver may enter a power transfer phase associated with receiving wireless power and receive a first data stream from the wireless power transmitter during the power transfer phase. The wireless power receiver receives reset information indicating reset of the first data stream from the wireless power transmitter, the wireless power receiver performs a reset of the first data stream based on receiving the reset information, and the wireless power receiver may transmit a response to the reset information to the wireless power transmitter based on performing the reset.

Hereinafter, the effects of this specification will be described.

To explain the effect, the specification explains the problems described above once again.

Basically, according to the present specification, a configuration is provided to discard all the buffer and incoming and/or outgoing data of the transport layer through reset or abort, even if the memory for data storage is stuck and recovery is no longer possible, the effect of solving this problem can be provided. In addition, in the case of reset, a configuration is provided to keep the corresponding application stream in an open state, so data communication can be performed immediately. That is, the time of data transmission can be optimized.

On the other hand, if a problem occurs in the storage/communication of data for a specific stream while various application data streams are in progress (or if a problem occurs in the transport layer), there may be cases where there are no problems with other streams (stream 1 and stream 3) except for the stream in which the problem occurred (as an example, assume that a problem occurred in stream 2).

Even in this case, if all streams are reset or forced terminated, reset or forced termination can also be performed on other streams (e.g. stream 1 and stream 3) that are not problematic. In this case, the wireless power transmitter and/or wireless power receiver may have to perform data communication from the beginning again, even for streams that do not have problems. This may be an inefficient method.

According to the present specification, when a problem occurs with a specific stream, the inefficiency of unnecessarily resetting or forcibly terminating a stream without a problem can be prevented by resetting or forcibly terminating only the specific stream. Accordingly, data streams without problems can continue to be transmitted, so data transmission time can be shortened.

Additionally, if the wireless power transmitter and/or wireless power receiver performs a reset as soon as it transmits reset information to the other party, communication errors may occur in which a response is not received from the other party, or even when a response is received, the response cannot be interpreted. In this specification, in order to prevent the above problem, in the case of data stream reset, the specification provides a configuration in which a wireless power transmitter and/or a wireless power receiver performs a reset after receiving a response from the other party instead of performing a reset as soon as reset information is transmitted to the other party. This can have the effect of preventing communication errors.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transferring a wireless power in a wireless power transfer system, the method performed by a wireless power transmitter and comprising:
   transmitting, to a wireless power receiver, an initial auxiliary data control (ADC) packet for opening a first data stream;
   transmitting, to the wireless power receiver, at least one auxiliary data transport (ADT) packet for the first data stream;
   transmitting, to the wireless power receiver, a reset ADC packet informing reset of the first data stream; and
   receiving, from the wireless power receiver, a response for the reset ADC packet,
   wherein the wireless power transmitter performs the reset of the first data stream based on receiving the response.

2. The method of claim 1, wherein the first data stream is maintained open before and after the reset.

3. The method of claim 2, wherein, after the reset, the wireless power transmitter transmits the first data stream to the wireless power receiver from beginning.

4. The method of claim 2, wherein the first data stream includes the initial ADC packet, the at least one ADT packet, or a final ADC packet for closing the first data stream, and wherein, after the reset, the wireless power transmitter transmits the at least one ADT packet to the wireless power receiver without transmitting the initial ADC packet.

5. The method of claim 1, wherein the wireless power transmitter transmits a second data stream to the wireless power receiver while transmitting the first data stream.

6. The method of claim 5, wherein, based on the wireless power transmitter receiving the response for the reset ADC packet from the wireless power receiver, the wireless power transmitter performs the reset of the first data stream without performing reset of the second data stream.

7. The method of claim 1, wherein the reset ADC packet includes information identifying the first data stream.

8. The method of claim 1, wherein the wireless power transmitter discards data stored below a transport layer based on performing the reset.

9. The method of claim 1, wherein the wireless power transmitter transmits abort information informing abort of the first data stream to the wireless power receiver based on not receiving the response.

10. The method of claim 9, wherein the wireless power transmitter performs the abort of the first data stream based on transmitting the abort information.

11. The method of claim 10, wherein, after the abort, the wireless power transmitter closes the first data stream.

12. The method of claim 9, wherein the wireless power transmitter performs the abort of the first data stream based on receiving a response for the abort information.

13. The method of claim 9, wherein the wireless power transmitter discards data stored below a transport layer based on performing the abort.

14. A wireless power transmitter, comprising:
    a converter related to transferring wireless power to a wireless power receiver;
    a communicator/controller related to controlling the transfer of the wireless power,
    wherein the wireless power transmitter:
    transmits, to the wireless power receiver, an initial auxiliary data control (ADC) packet for opening a first data stream;
    transmits, to the wireless power receiver, at least one auxiliary data transport (ADT) packet for the first data stream;
    transmits, to the wireless power receiver, a reset ADC packet informing reset of the first data stream; and
    receives, from the wireless power receiver, a response for the reset ADC packet,
    wherein the wireless power transmitter performs the reset of the first data stream based on receiving the response.

15. A method for receiving wireless power in a wireless power transfer system, the method performed by a wireless power receiver and comprising:
    receiving, from a wireless power transmitter, an initial auxiliary data control (ADC) packet for opening a first data stream;
    receiving, from the wireless power transmitter, at least one auxiliary data transport (ADT) packet for the first data stream;
    receiving, from the wireless power transmitter, a reset ADC packet informing reset of the first data stream; and
    transmitting, to the wireless power transmitter, a response for the reset ADC packet,
    wherein the first data stream is reset based on the response.

* * * * *